(12) United States Patent
Sharma et al.

(10) Patent No.: US 11,967,000 B2
(45) Date of Patent: Apr. 23, 2024

(54) METHODS AND SYSTEMS FOR GENERATING ONE OR MORE EMOTICONS FOR ONE OR MORE USERS

(71) Applicant: Samsung Electronics Co., Ltd., Suwon-si (KR)

(72) Inventors: Dimple Sharma, Noida (IN); Dewesh Deo Singh, Noida (IN); Sattdeepan Dutta, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 85 days.

(21) Appl. No.: 17/875,961

(22) Filed: Jul. 28, 2022

(65) Prior Publication Data

US 2022/0398787 A1    Dec. 15, 2022

Related U.S. Application Data

(63) Continuation of application No. PCT/KR2022/008242, filed on Jun. 10, 2022.

(30) Foreign Application Priority Data

Jun. 11, 2021 (IN) .............................. 202111026134

(51) Int. Cl.
*G06T 11/00* (2006.01)
*G06F 40/205* (2020.01)
(Continued)

(52) U.S. Cl.
CPC ............ *G06T 11/00* (2013.01); *G06F 40/205* (2020.01); *G06F 40/35* (2020.01); *G06N 3/094* (2023.01); *G10L 15/1822* (2013.01)

(58) Field of Classification Search
CPC ......... G06T 11/00; G06T 7/73; G06F 40/205; G06F 18/211; G10L 15/1822;
(Continued)

(56) References Cited

U.S. PATENT DOCUMENTS 10,607,065 B2 *  3/2020  Milman ................... G06T 13/80
10,713,821 B1 *  7/2020  Surya ...................... G06N 3/045
(Continued)

FOREIGN PATENT DOCUMENTS

CN    111311702 A     6/2020
KR    10-1905501 B1   10/2018
(Continued)

OTHER PUBLICATIONS

Corentin Hardy et al., MD-GAN: Multi-Discriminator Generative Adversarial Networks for Distributed Datasets, 2019 IEEE International Parallel and Distributed Processing Symposium (IPDPS), May 2019.

(Continued)

*Primary Examiner* — Chante E Harrison
(74) *Attorney, Agent, or Firm* — Jefferson IP Law, LLP

(57) ABSTRACT

A method for generating one or more emoticons for one or more users with respect to one or more fictional characters is provided. The method includes receiving a first image generated by a multiple localized discriminator (MLD) generative adversarial network (GAN) based on a set of features from multiple sets of features associated with the one or more fictional characters, resulting in generation of an output value associated with each of the plurality of discriminators, determining a weight associated with each of the plurality of discriminators based on a distance between each discriminator and the set of features, generating an image info-graph associated with the first image generated by the MLD GAN upon receiving the first image, calculating a relevance associated with each of the plurality of discriminators based on the image info-graph, the set of features and the distance, and generating a plurality of images representing a plurality of emoticons associated with the one or more (Continued)

fictional characters based on each of the multiple sets of features.

20 Claims, 25 Drawing Sheets

(51) Int. Cl.
*G06F 40/35* (2020.01)
*G06N 3/094* (2023.01)
*G10L 15/18* (2013.01)

(58) Field of Classification Search
CPC ... H04M 1/72427; G06N 3/0475; G06N 3/08; G06N 3/094; G06N 20/00
See application file for complete search history.

(56) References Cited

U.S. PATENT DOCUMENTS

| | | |
|---|---|---|
| 11,204,956 B2 | 12/2021 | Javier et al. |
| 11,218,433 B2 | 1/2022 | Baldwin et al. |
| 11,256,901 B2 | 2/2022 | Zhang et al. |
| 11,461,949 B2 | 10/2022 | Choi et al. |
| 11,810,374 B2 * | 11/2023 | Wang ...................... G06V 20/63 |
| 2019/0250782 A1 | 8/2019 | Ramachandra Lyer |
| 2020/0104574 A1 | 4/2020 | Han et al. |
| 2020/0137001 A1 | 4/2020 | Wu et al. |
| 2020/0193272 A1 * | 6/2020 | Chudak .................... G06N 3/06 |
| 2021/0192800 A1 * | 6/2021 | Dutta ..................... G06F 40/205 |
| 2022/0076374 A1 * | 3/2022 | Li ........................ G06N 20/00 |
| 2022/0377257 A1 * | 11/2022 | Wilson .................... G06N 20/00 |
| 2023/0260164 A1 * | 8/2023 | Yuan ...................... G06N 20/00 |
| | | 382/157 |

FOREIGN PATENT DOCUMENTS

| | | | |
|---|---|---|---|
| KR | 10-2019-0077623 A | 7/2019 | |
| WO | WO-2022076234 A1 * | 4/2022 | ............ G06N 3/045 |

OTHER PUBLICATIONS

Ishan Durugkar et al., Generative Multi-Adversarial Networks, arXiv:1611.01673v3, Mar. 2, 2017.
Yijun Li et al., Few-shot Image Generation with Elastic Weight Consolidation, arXiv:2012.02780v1, Dec. 2020.
International Search Report dated Sep. 13, 2022, issued in International Application No. PCT/KR2022/008242.

* cited by examiner

INFOGRAPH in 2-Dimensions
It contains both words and fictional characters
embedded in N Dimensional space

INFOGRAPH in 2-Dimensions
K-Discriminators are also evenly distributed in space, which are
trained to correctly classify the images that are closer to them.
[Multiple Localized Discriminators]

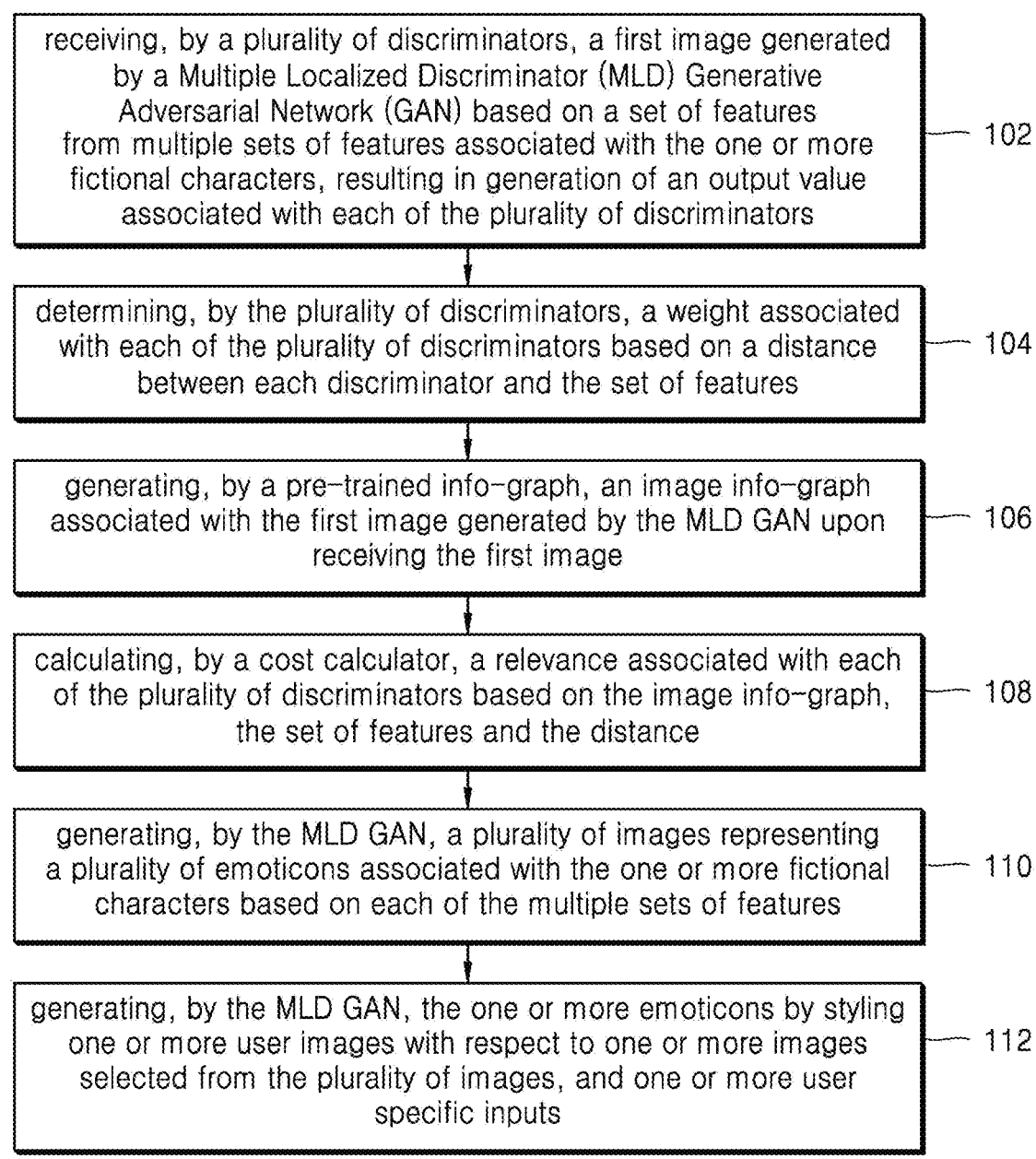

700

FIG. 13A
1300a
Providing wallpapers so that user remains connected to the story even when no new episodes/books are coming
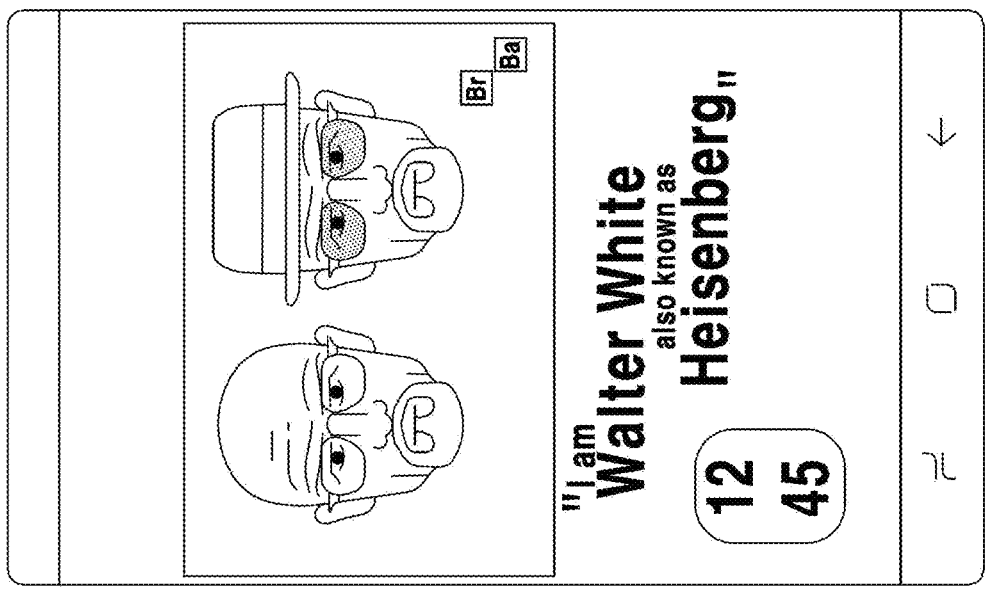

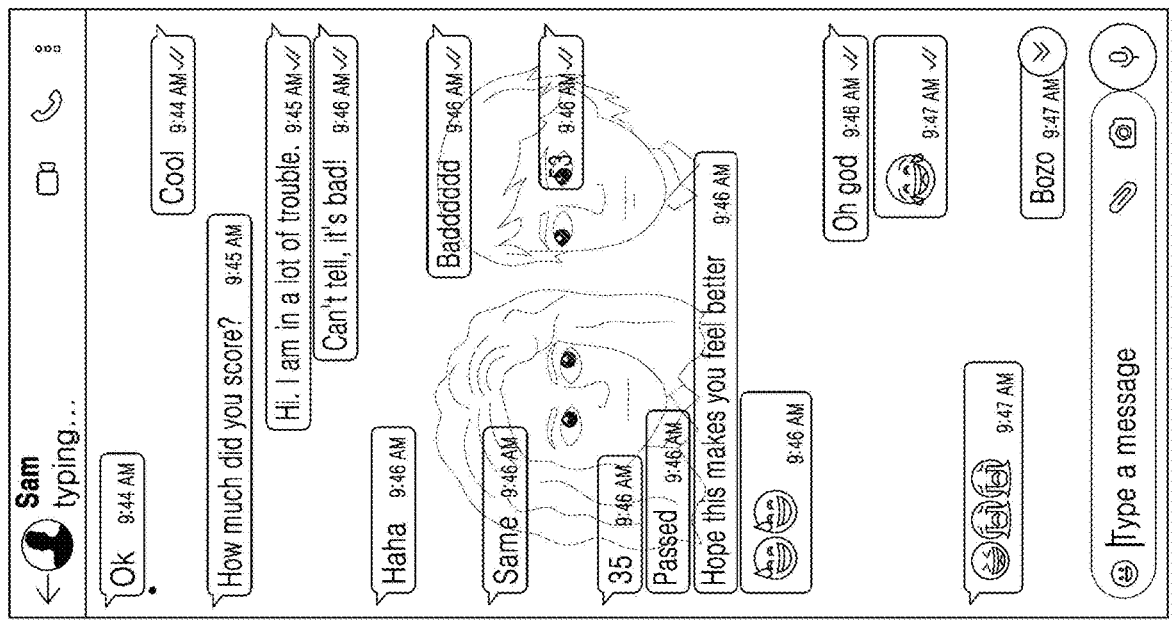
FIG. 13B
1300b
Chat wallpapers for individual contact and even group depicts the kind of bond and experiences shared by characters
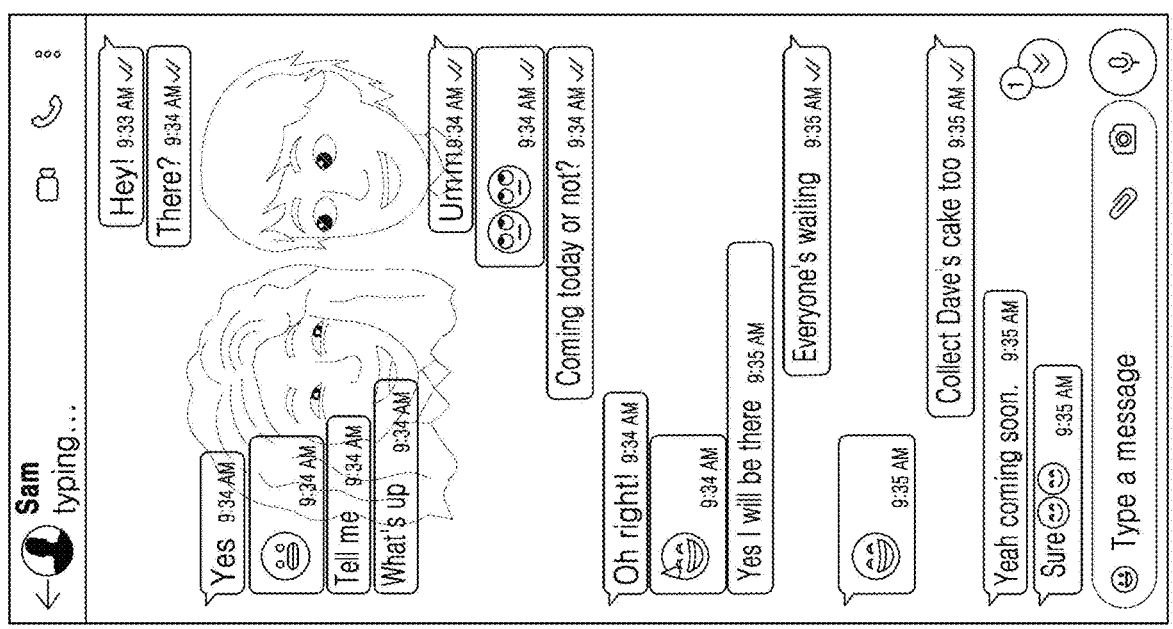

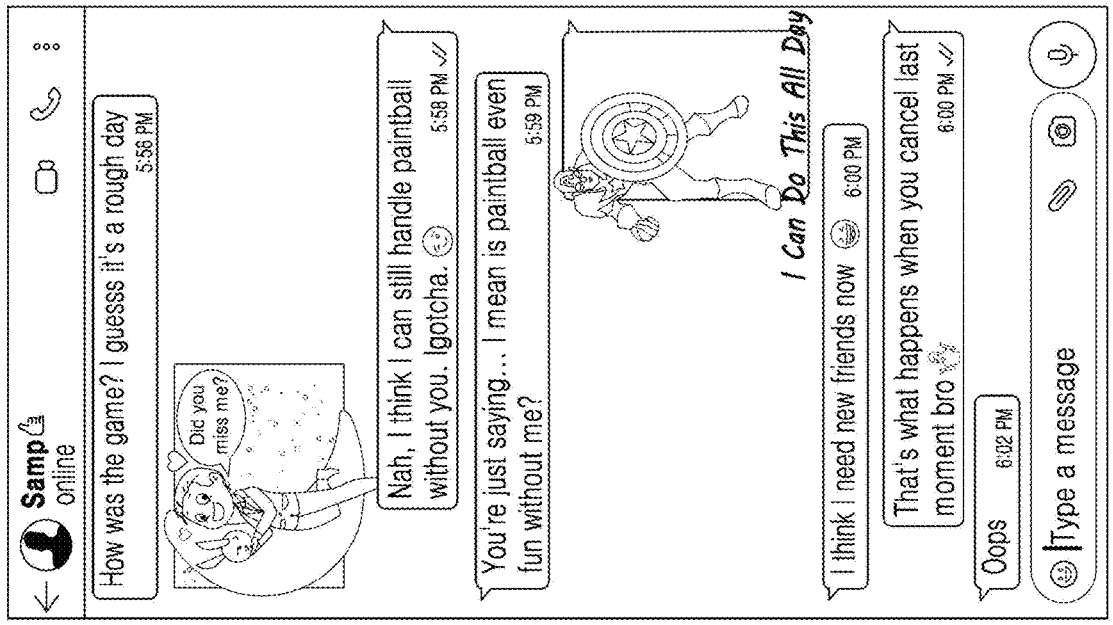
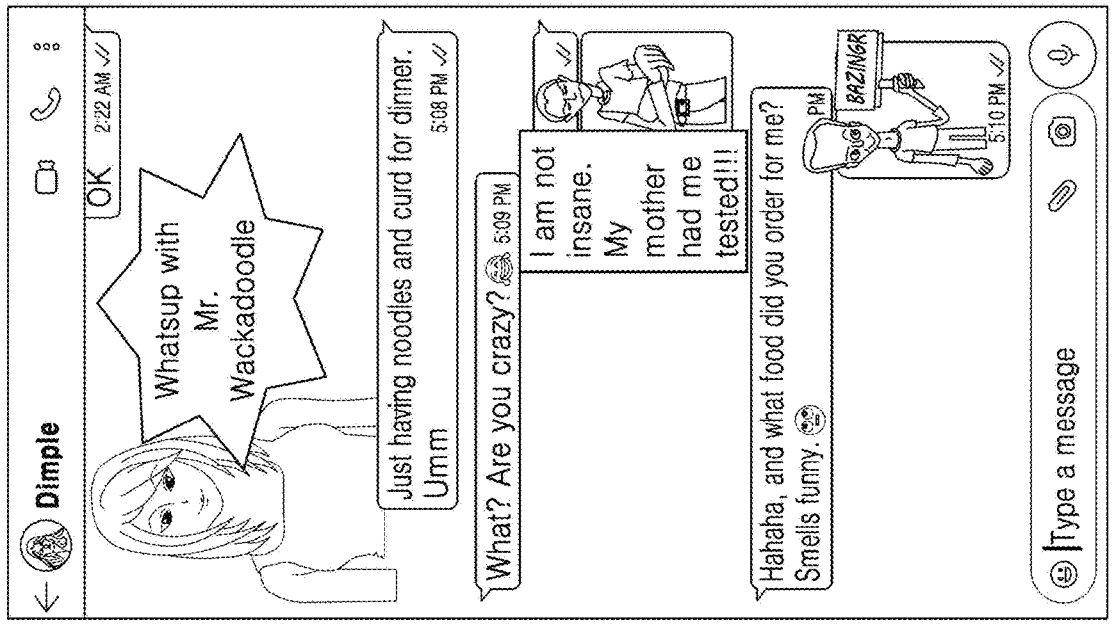
FIG. 14C

FIG. 15

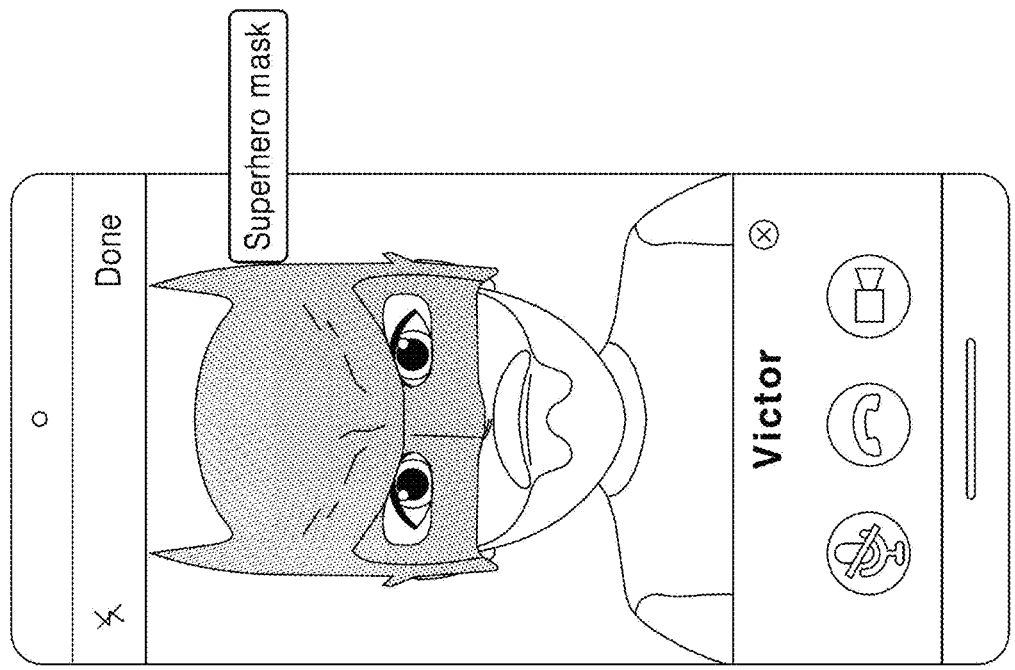
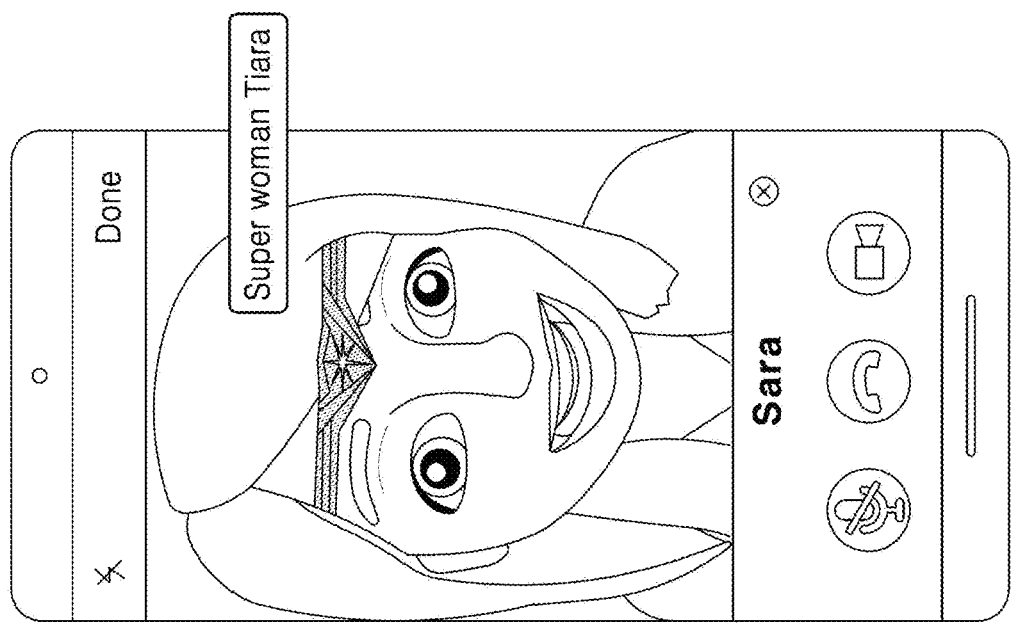
FIG. 16

FIG. 19
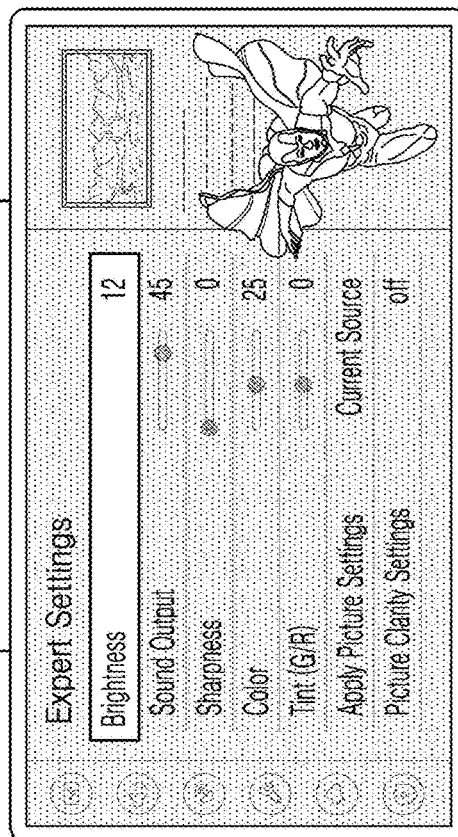
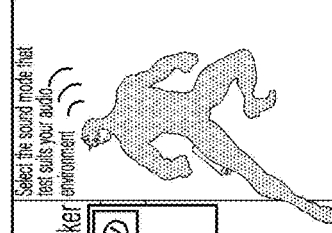
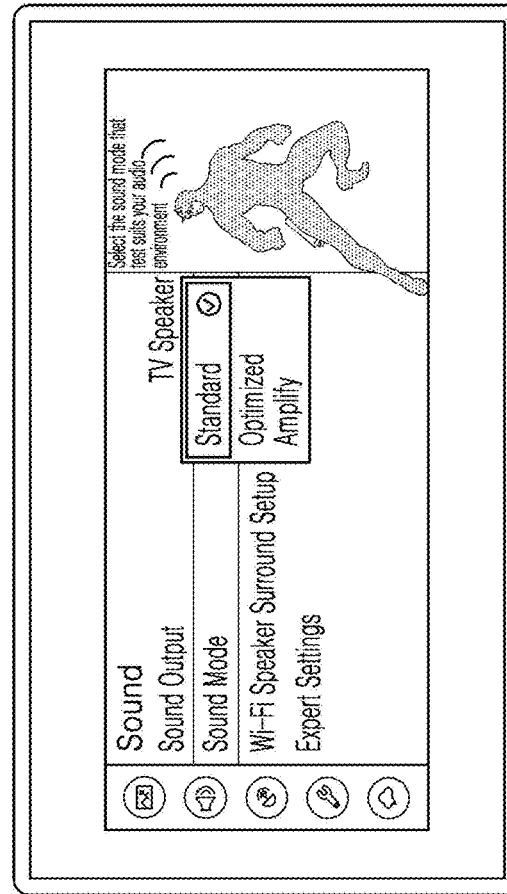

METHODS AND SYSTEMS FOR GENERATING ONE OR MORE EMOTICONS FOR ONE OR MORE USERS

CROSS-REFERENCE TO RELATED APPLICATION(S)

This application is a continuation application, claiming priority under § 365(c), of an International application No. PCT/KR2022/008242, filed on Jun. 10, 2022, which is based on and claims the benefit of an Indian patent application number 202111026134, filed on Jun. 11, 2021, in the Indian Intellectual Property Office, the disclosure of which is incorporated by reference herein in its entirety.

TECHNICAL FIELD

The disclosure relates to generating one or more emoticons for one or more users. More particularly, the disclosure relates to generating the one or more emoticons for the one or more users through a multiple localized discriminator (MLD) generative adversarial network (GAN).

BACKGROUND

With the advent of technology, various techniques for improving user's experience of providing inputs via touch-based keyboards that are implemented in computing devices, have been devised. Most of these techniques are majorly focused on saving user's time, for example, by providing suggestions for word completion, next word suggestions, and suggestions for auto-correction, or in some cases graphics interchange format (GIF) suggestions.

Traditionally, ways of generating emoticons are either from image or by selecting each physical appearance feature manually. Story characters have certain properties that are distinguishing features in their appearances like facial features, a physique, a hairstyle, a spectacle type, an accessory (i.e., a hat or a piercing), or the like. All the feature needs to be added or modified by user manually to resemble a given story character and the process is labor intensive. A user can only add the features that are available in the library. No option for custom feature addition. There is no existing way to add or modify elements to other user's emoticons.

Entertainment content in the form of online streaming or online books is gigantic these days. However, existing emoticons are all general-purpose and do not provide any correlation to story context and story specific elements.

Moreover, existing emoticons generations are either from image or by selecting each physical appearance feature manually. Story characters have certain distinguishing features in their appearances like a hairstyle, a spectacle type, an accessory (i.e., a hat or a piercing), or the like. These features need to be added by user manually to resemble a given story character and the process is labor intensive.

The existing solutions create avatars of users which are general-purpose and can be used in on-going conversations. None of these provide any correlation to story context and story specific elements that can make conversations quite playful.

The avatars are limited to matching physical appearance features of users. There is no inclusion of behavioral traits in any way whatsoever.

Fictional characters are available as avatars in Samsung's AR Emoji and Apple's Animoji. However, these avatars directly represent some fictional character (like Mickey Mouse or a unicorn). They lack the feature of styling user's avatar in fictional character's style. For example, instead of using Mickey Mouse avatar, user's avatar will have ears and nose like mickey mouse along with red pant outfit using this disclosure.

A company offers Friendmoji in which emoticons of a user and user's friend appear together in stickers. Others generate avatar for a given user and make items like stickers specific to given user. Since there is no correlation with story context, there is no mapping of fictional characters and real-life characters (contact group of given user).

There is a need for a solution to overcome the above-mentioned drawbacks.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a selection of concepts in a simplified format that are further described in the detailed description of the disclosure. This summary is not intended to identify key or essential inventive concepts of the claimed subject matter, nor is it intended for determining the scope of the claimed subject matter. In accordance with the purposes of the disclosure, the disclosure as embodied and broadly described herein, describes method and system generating a one or more emoticons for one or more users with respect to one or more fictional characters.

Additional aspects will be set forth in part in the description which follows and, in part, will be apparent from the description, or may be learned by practice of the presented embodiments.

In accordance with an aspect of the disclosure, a method for generating one or more emoticons for one or more users with respect to one or more fictional characters is provided. The method includes, receiving, by a plurality of discriminators, a first image generated by a multiple localized discriminator (MLD) generative adversarial network (GAN) based on a set of features from multiple sets of features associated with the one or more fictional characters, resulting in generation of an output value associated with each of the plurality of discriminators. The method includes determining, by the plurality of discriminators, a weight associated with each of the plurality of discriminators based on a distance between each discriminator and the set of features. The method includes generating, by a pre-trained info-graph, an image info-graph associated with the first image generated by the MLD GAN upon receiving the first image. The method includes calculating, by a cost calculator, a relevance associated with each of the plurality of discriminators based on the image info-graph, the set of features and the distance. The method includes generating, by the MLD GAN, a plurality of images representing a plurality of emoticons associated with the one or more fictional characters based on each of the multiple sets of features. The method includes generating, by the MLD GAN, the one or more emoticons by styling one or more user images with respect to one or more images selected from the plurality of images, and one or more user specific inputs.

In accordance with another aspect of the disclosure, a system for generating a one or more emoticons for one or more users with respect to one or more fictional characters is provided. The system includes a plurality of discriminators configured to receive a first image generated by a MLD GAN based on a set of features from multiple sets of features associated with the one or more fictional characters, resulting in generation of an output value associated with each of the plurality of discriminators. The plurality of discriminators is further configured to determine a weight associated with each of the plurality of discriminators based on a distance between each discriminator and the set of features. The system includes a pre-trained info-graph configured to generate an image info-graph associated with the first image generated by the MLD GAN upon receiving the first image. The system a cost calculator configured to calculate a relevance associated with each of the plurality of discriminators based on the image info-graph, the set of features and the distance. The system includes the MLD GAN configured to generate a plurality of images representing a plurality of emoticons associated with the one or more fictional characters based on each of the multiple sets of features. The MLD GAN is further configured to generate the one or more emoticons by styling one or more user images with respect to one or more images selected from the plurality of images, and one or more user specific inputs.

Other aspects, and advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A illustrates a flow diagram depicting a method for generating one or more emoticons for one or more users with respect to one or more fictional characters according to an embodiment of the disclosure;

FIG. 13A illustrates an application use case depicting generation wallpapers and screensavers in style of one or more fictional character based on personality traits according to an embodiment of the disclosure;

FIG. 13B illustrates an application use case associated with one or more chat wallpapers according to an embodiment of the disclosure;

FIG. 14C illustrates an application use case depicting context-based chat stickers and GIFs matching a response from a sender according to an embodiment of the disclosure;

FIG. 15 illustrates an application use case depicting generation of contact photos in style of one or more fictional characters according to an embodiment of the disclosure;

FIG. 16 illustrates an application use case depicting generation of one or more emoticons for video calling and social media stories according to an embodiment of the disclosure;

FIG. 19 illustrates an application use case depicting generation of one or more emoticons for system settings according to an embodiment of the disclosure.

Figure 1A:
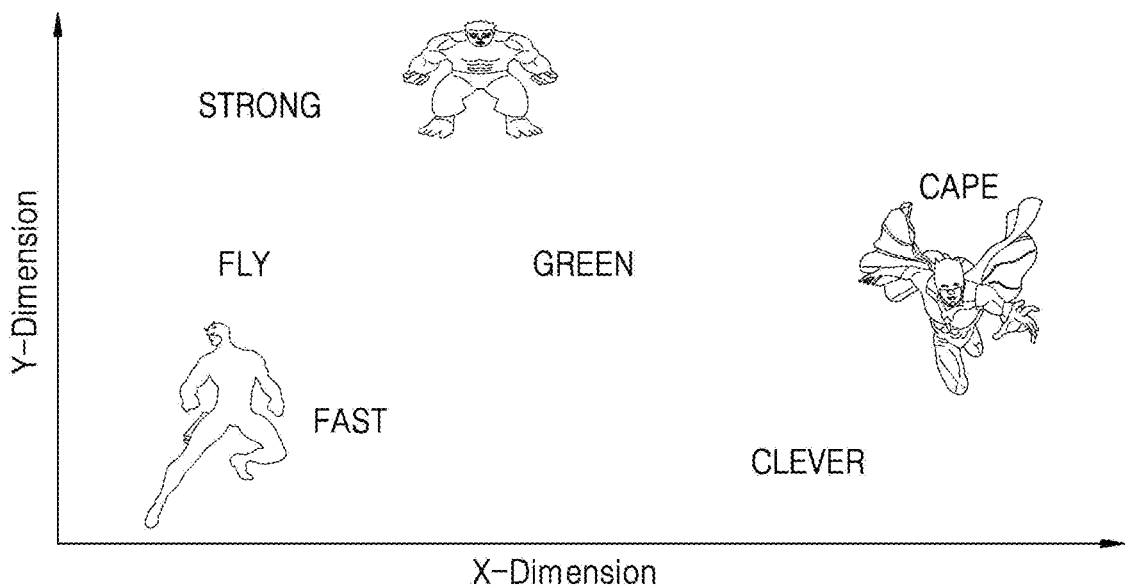
FIGS. 1A and 1B illustrate an information graph with characters and characteristics in 2 dimensional word embedding according to various embodiments of the disclosure.

Further, skilled artisans will appreciate that elements in the drawings are illustrated for simplicity and may not have been necessarily been drawn to scale. For example, the flow charts illustrate the system in terms of the most prominent operations involved to help to improve understanding of aspects of the disclosure. Furthermore, in terms of the construction of the device, one or more components of the device may have been represented in the drawings by symbols of the related art, and the drawings may show only those specific details that are pertinent to understanding the embodiments of the disclosure so as not to obscure the drawings with details that will be readily apparent to those of ordinary skill in the art having benefit of the description herein according to the related art.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or system that comprises a list of operations does not include only those operations but may include other operations not expressly listed or inherent to such process or system. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, systems, and examples provided herein are illustrative only and not intended to be limiting.

Embodiments of the disclosure subject matter are described below with reference to the accompanying drawings.

Generative Adversarial Networks (GANs for short) are generative models, meaning that GANs are used to generate new realistic data from the probability distribution of the data in a given dataset. A GAN is a machine learning model, and more specifically a certain type of deep neural networks. An multiple localized discriminator (MLD) GAN may be a method of training a GAN in a distributed fashion, that is to say over the data of a set of participating workers (e.g., datacenters connected through WAN, or devices at the edge of the Internet). MLD GAN is a new modification in the GAN model that utilizes the classification power of multiple discriminator models instead of a single discriminator model. Also, the localization of discriminator models enables the model to have a better sense of classification for the output which is in it's cluster as compared to the rest. When the scope of output is diverse, then the GANs do not perform well because the discriminators have to classify a wide range of diverse outputs. For this purpose, if MLDs are used, the MLDs will improve the classification, as the discriminators will not be classifying diverse outputs. Initially, an information-graph (info-graph) has be generated by putting all the characters and characteristics in N dimensional word embedding space for localizing the multiple discriminators.

Figure 1B:
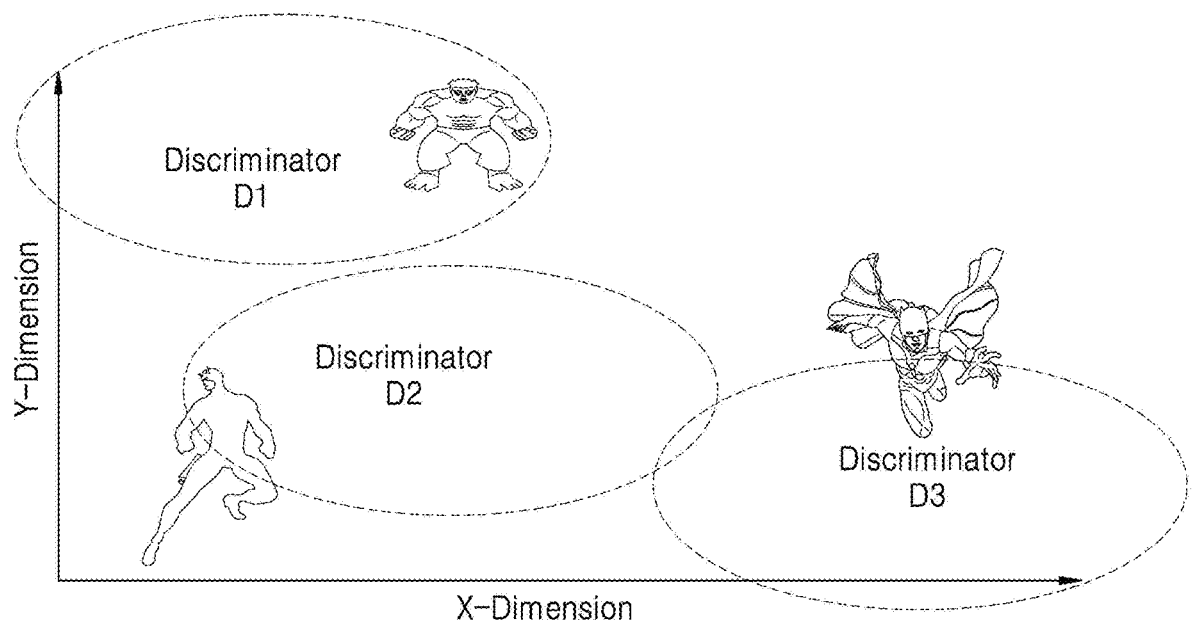

FIGS. 1A and 1B illustrate an information graph with characters and characteristics in 2 dimensional word embedding according to various embodiments of the disclosure.

Referring to FIG. 1A, it illustrates an information graph with characters and characteristics in 2 dimensional word embedding according to an embodiment of the disclosure. The localized discriminators may be good at identifying certain types of images but not good at identifying other types of images. Therefore, if the word embedding model generates a word embedding graph in N dimensions, the M clusters are created in complete word embedding space along with a local discriminator $D_i$ for each cluster (i).

Referring to FIG. 1B, it illustrates clusters in word embedding space with local discriminators for each cluster according to an embodiment of the disclosure. The training part of MLD GAN will be further explained later referring to FIG. 8.

FIG. 2A illustrates a flow diagram depicting a method for generating one or more emoticons for one or more users with respect to one or more fictional characters according to an embodiment of the disclosure.

Referring to FIG. 2A, a method 100 may be configured to generate the one or more emoticons through the multiple localized discriminator (MLD) generative adversarial network (GAN) and a genetic algorithm.

In accordance with an embodiment of the disclosure, the method 100 includes receiving at operation 102, by a plurality of discriminators, a first image generated by an MLD GAN based on a set of features from multiple sets of features associated with the one or more fictional characters, resulting in generation of an output value associated with each of the plurality of discriminators. The features may be characteristics such as 'smart', 'fat', intelligent', etc.

Furthermore, the method includes determining at operation 104, by the plurality of discriminators, a weight associated with each of the plurality of discriminators based on a distance between each discriminator and the set of features.

Moving forward, the method includes generating at operation 106, by a pre-trained info-graph, an image info-graph associated with the first image generated by the MLD GAN upon receiving the first image.

Continuing with the above embodiment of the disclosure, the method 100 includes calculating at operation 108, by a cost calculator, a relevance associated with each of the plurality of discriminators based on the image info-graph, the set of features and the distance.

Furthermore, the method 100 includes generating at operation 110, by the MLD GAN, a plurality of images representing a plurality of emoticons associated with the one or more fictional characters based on each of the multiple sets of features.

In continuation with the above embodiment of the disclosure, the method 100 includes generating at operation 112, by the MLD GAN, the one or more emoticons by styling one or more user images with respect to one or more images selected from the plurality of images, and one or more user specific inputs.

Figure 2B:
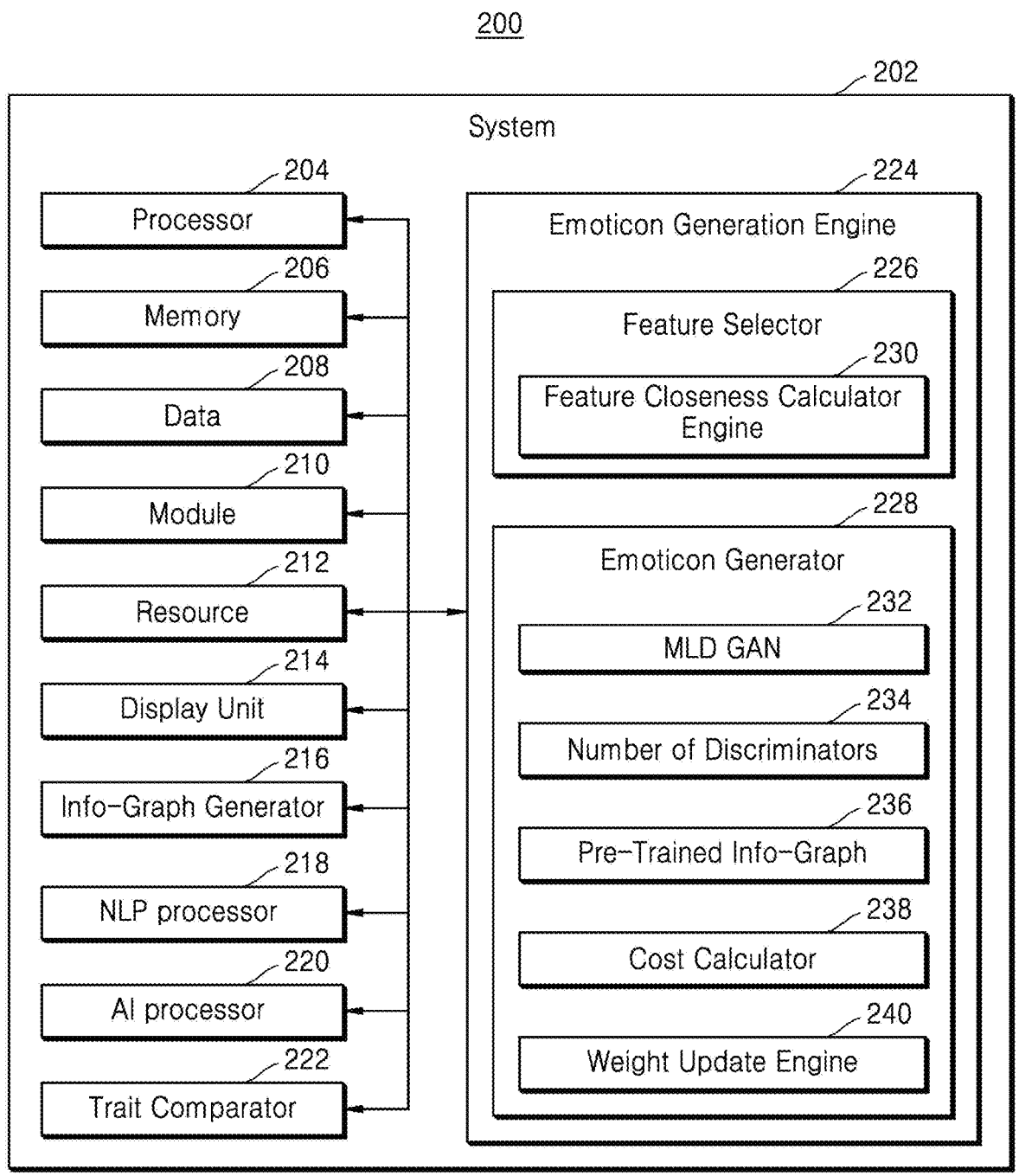
FIG. 2B illustrates a schematic block diagram 200 of a system for generating one or more emoticons for one or more users with respect to one or more fictional characters according to an embodiment of the disclosure.

FIG. 2B illustrates a schematic block diagram 200 of a system 202 for generating one or more emoticons for one or more users with respect to one or more fictional characters according to an embodiment of the disclosure.

Referring to FIG. 2B, in an embodiment of the disclosure, the system 202 may be incorporated in a user equipment (UE). Examples of the UE may include, but are not limited to a laptop, a tab, a smart phone, a personal computer (PC). In an embodiment of the disclosure, the one or more fictional characters may be based one or more of a story, a conversation, a textual input, and a voice input. Further, the system 202 may be configured to generate the one or more emoticons by a MLD GAN based on a fictional character info-graph, one or more user specific inputs, and one or more images associated with the one or more users. Details of the above aspects performed by the system 202 shall be explained below.

The system 202 includes a processor 204, a memory 206, data 208, module (s) 210, resource (s) 212, a display unit 214, an info-graph generator 216, a natural language processing (NLP) processor 218, an artificial intelligence (AI) processor 220, a trait comparator 222, an emoticon generation engine 224, a feature selector 226, an emoticon generator 228, a feature closeness calculator engine 230, a MLD GAN 232, a number of discriminators 234, a pre-trained info-graph 236, a cost calculator 238, and a weight update engine 240. In an embodiment of the disclosure, the processor 204, the memory 206, the data 208, the module (s) 210, the resource (s) 212, the display unit 214, the info-graph generator 216, the NLP processor 218, the AI processor 220, the trait comparator 222, the emoticon generation engine 224, the feature selector 226, the emoticon generator 228, the feature closeness calculator engine 230, the MLD GAN 232, the number of discriminators 234, the pre-trained info-graph 236, the cost calculator 238, and the weight update engine 240 may be communicatively coupled to one another. All or at least one of the module 210, the info-graph generator 216, NLP processor 218, AI processor 220, the trait comparator 222, the emoticon generation engine 224 may be combined into the processor 204.

At least one of the plurality of modules may be implemented through an AI model. A function associated with AI may be performed through the non-volatile memory or the volatile memory, and/or the processor.

The processor may include one or a plurality of processors. At this time, one or a plurality of processors may be a general purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU).

A plurality of processors control the processing of the input data in accordance with a predefined operating rule or artificial intelligence (AI) model stored in the non-volatile memory or the volatile memory. The predefined operating rule or artificial intelligence model is provided through training or learning. Here, being provided through learning means that, by applying a learning technique to a plurality of learning data, a predefined operating rule or AI model of a desired characteristic is made. The learning may be performed on a device itself in which AI according to an embodiment is performed, and/or may be implemented through a separate server/system. The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

According to the present subject matter, in a method of an electronic device, a method of generating one or more emoticons associated with one or more users with respect to one or more fictional characters, by using image data as input data for an artificial intelligence model. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training technique. The artificial intelligence model may include a plurality of neural network layers. Each of the plurality of neural network layers includes a plurality of weight values and performs neural network computation by computation between a result of computation by a previous layer and the plurality of weight values.

Visual understanding is a technique for recognizing and processing things as does human vision and includes, e.g., object recognition, object tracking, image retrieval, human recognition, scene recognition, 3D reconstruction/localization, or image enhancement.

As would be appreciated, the system 202, may be understood as one or more of a hardware, a software, a logic-based program, a configurable hardware, and the like. In an example, the processor 204 may be a single processing unit or a number of units, all of which could include multiple computing units. The processor 204 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 204 may be configured to fetch and/or execute computer-readable instructions and/or data stored in the memory 206.

In an example, the memory 206 may include any non-transitory computer-readable medium known in the art including, for example, volatile memory, such as a static random access memory (SRAM) and/or a dynamic random access memory (DRAM), and/or a non-volatile memory, such as a read-only memory (ROM), erasable programmable ROM (EPROM), flash memory, hard disks, optical disks, and/or magnetic tapes. The memory 206 may include the data 208. The data 208 serves, amongst other things, as a repository for storing data processed, received, and generated by one or more of the processor 204, the memory 206, the data 208, the module (s) 210, the resource (s) 212, the display unit 214, the info-graph generator 216, the NLP subsystem 218, the AI processor 220, the trait comparator 222, the emoticon generation engine 224, the feature selector 226, the emoticon generator 228, the feature closeness calculator engine 230, the MLD GAN 232, the number of discriminators 234, the pre-trained info-graph 236, the cost calculator 238, and the weight update engine 240.

The module(s) 210, amongst other things, may include routines, programs, objects, components, data structures, or the like, which perform particular tasks or implement data types. The module(s) 210 may also be implemented as, signal processor(s), state machine(s), logic circuitries, and/or any other device or component that manipulate signals based on operational instructions.

Further, the module(s) 210 may be implemented in hardware, as instructions executed by at least one processing unit, e.g., processor 204, or by a combination thereof. The processing unit may be a general-purpose processor that executes instructions to cause the general-purpose processor to perform operations or, the processing unit may be dedicated to performing the required functions. In another aspect of the disclosure, the module(s) 210 may be machine-readable instructions (software) which, when executed by a processor/processing unit, may perform any of the described functionalities.

In some example embodiments of the disclosure, the module(s) 210 may be machine-readable instructions (software) which, when executed by a processor 204/processing unit, perform any of the described functionalities.

The resource(s) 212 may be physical and/or virtual components of the system 202 that provide inherent capabilities and/or contribute towards the performance of the system 202. Examples of the resource(s) 212 may include, but are not limited to, a memory (e.g., the memory 206), a power unit (e.g., a battery), a display unit (e.g., the display unit 214) or the like. The resource(s) 212 may include a power unit/battery unit, a network unit, or the like, in addition to the processor 204, and the memory 206.

The display unit 214 may display various types of information (for example, media contents, multimedia data, text data, or the like) to the system 202. The display unit 214 may include, but is not limited to, a liquid crystal display (LCD), a light-emitting diode (LED) display, an organic LED (OLED) display, a plasma cell display, an electronic ink array display, an electronic paper display, a flexible LCD, a flexible electrochromic display, and/or a flexible electrowetting display.

In an example, the info-graph generator 216, the NLP processor 218, the AI processor 220, the trait comparator 222, the emoticon generation engine 224, the feature selector 226, the emoticon generator 228, the feature closeness calculator engine 230, the MLD GAN 232, the number of discriminators 234, the pre-trained info-graph 236, the cost calculator 238, and the weight update engine 240, amongst other things, include routines, programs, objects, components, data structures, or the like, which perform particular tasks or implement data types. The info-graph generator 216, the NLP processor 218, the AI processor 220, the trait comparator 222, the emoticon generation engine 224, the feature selector 226, the emoticon generator 228, the feature closeness calculator engine 230, the MLD GAN 232, the number of discriminators 234, the pre-trained info-graph 236, the cost calculator 238, and the weight update engine 240 may also be implemented as, signal processor(s), state machine(s), logic circuitries, and/or any other device or component that manipulate signals based on operational instructions. Further, the info-graph generator 216, the NLP processor 218, the AI processor 220, the trait comparator 222, the emoticon generation engine 224, the feature selector 226, the emoticon generator 228, the feature closeness calculator engine 230, the MLD GAN 232, the number of discriminators 234, the pre-trained info-graph 236, the cost calculator 238, and the weight update engine 240 can be implemented in hardware, instructions executed by a processing unit, or by a combination thereof. The processing unit can comprise a computer, a processor, such as the processor 204, a state machine, a logic array or any other suitable devices capable of processing instructions. The processing unit can be a general-purpose processor which executes instructions to cause the general-purpose processor to perform the required tasks or, the processing unit can be dedicated to perform the required functions.

In an embodiment of the disclosure, the info-graph generator 216 configured to generate a fictional character info-graph associated with the one or more fictional characters based on a number of features associated with the one or more fictional characters. Furthermore, the info-graph generator 216 may be configured to generate a user info-graph associated with the one or more users based on a number of attributes associated with the one or more users. Moving forward, the info-graph generator 216 may be configured to map the one or more fictional characters with the one or more users based on the number of features and the number of attributes. The fictional character info-graph may be a graph with plotting of fictional characters on an N dimensional vector space filled with various words such as "tall", "strong", "fact", etc. and the user info-graph may be a graph with plotting of features of the user on the N dimensional vector space filled with various words.

In an embodiment of the disclosure, the info-graph generator 216 may include the NLP processor 218, the AI processor 220, and the trait comparator 222. In an embodiment of the disclosure, the NLP processor 218 may be configured to generate a fictional character info-graph by analyzing one or more conversations and one or more dialogue exchanges between the one or more fictional characters with respect to an event node of a plot graph associated with the one or more fictional characters. In an embodiment of the disclosure, the plot graph may be a representation of a space of a number of possible stories associated with a scenario. Furthermore, the NLP processor 218 may be configured to determine the number of features upon analyzing the one or more conversations and one or more dialogue exchanges. In an embodiment of the disclosure, the number of features may include an interaction profile from one or more event nodes shared by the one or more fictional characters, an emotional pallet associated with the one or more fictional characters describing a level of expression of one or more emotions experienced by the one or more fictional characters, and one or more physical traits based on a textual description from the plot graph and one or more personality traits from the interaction profile and the emotion pallet for the one or more fictional characters. The interaction profile may represent a set of collected features of the user which are determined after analyzing the interaction of the user with other users via texts, calls, or etc. The user's interaction with various other events may be, for example, a user's response to a feedback survey, a questionnaire, and etc. In an embodiment of the disclosure, the emotional pallet may mean a set of emotional features of a person and the strength—the level of expression—of the features. The level of expression indicates the strength of expression. For example, the expression of "happy" is a low level (or the first level) of expression and "very happy" is a high level (or the second level) of expression.

In an embodiment of the disclosure, the NLP processor 218 may be configured to generate a user info-graph by analyzing one or more conversations and one or more dialogue exchanges between the one or more users with respect to an event node of a plot graph associated with the one or more users and one or more social media activities of the one or more users. The NLP processor 218 may be configured to determine the number of attributes upon analyzing the one or more conversations and one or more dialogue exchanges. In an embodiment of the disclosure, the number of attributes may include an interaction profile from one or more event nodes shared by the one or more users, an emotional pallet associated with the one or more users describing a level of expression of one or more emotions experienced by the one or more users, and one or more physical traits based on a textual description from the plot graph and one or more personality traits from the interaction profile and the emotional pallet for the user.

Further, the AI processor 220 may be configured to parse one or more of an audio input and a visual input to a textual form. Furthermore, the AI processor 220 may be configured to share the textual form with the NLP processor 218 for determining the interaction profile, the emotional pallet, and the one or more physical traits and the one or more personality traits. In an embodiment of the disclosure, parsing may include processing of an image, an audio, a video, and a multimedia content received in the form of the one or more of the audio input, and the visual input.

Continuing with the above embodiment of the disclosure, the trait comparator 222 may be configured to map the one or more fictional characters with the one or more users by calculating, a distance between the number of features and the number of attributes. Furthermore, the trait comparator 222 may be configured to create a mapping associated with the one or more users mapped to the one or more fictional character based on the distance. In an embodiment of the disclosure, the one or more users may be mapped to the one or more fictional characters. In an embodiment of the disclosure, the number of features associated with the one or more fictional characters and the number of attributes associated with the one or more users may be selected from a content database by a user. The attributes may be called as categories such as personality traits, physical appearance traits, conversational traits, etc. Each of the traits may be further explained by features such as 'tall', 'short', 'fat', 'confident', 'intelligent', etc. Each attribute may be made up of some features. Thus, the average of the attribute can be calculated as a mean value or a value corresponding to the center position of the features. Here, each feature can be represented by a vector which is developed from the word embedding model. Once the vector representation of an attribute is calculated, the distance between the feature and the attribute can be obtained as the distance between the vector representation of the feature and the vector representation of the attribute.

In an embodiment of the disclosure, the emoticon generation engine may be configured to select the one or more features from the number of features and generate the one or more emoticons associated with the one or more users. In an embodiment of the disclosure, the emoticon generation engine may incorporate the feature selector 226 and the emoticon generator 228. In an embodiment of the disclosure, the feature selector 226 may be configured to receive the fictional character info-graph comprising the number of features associated with the one or more fictional characters. Furthermore, the feature selector 226 may be configured to select one or more features from the number of features uniquely defining the one or more fictional characters and transmitting the set of features. In an embodiment of the disclosure, the feature selector 226 may be configured to select the one or more features based on determining a character closeness ratio representing a closeness between the one or more fictional characters based on a distance between the one or more fictional characters. In an embodiment of the disclosure, the feature selector 226 may include a feature closeness calculator engine 230 configured to determine the character closeness ratio. In an embodiment of the disclosure, the feature closeness calculator engine 230 may be a reinforcement-based engine.

The calculation of the distance between the characters is explained in detail as follows. Every character may have a certain set of features describing the user. The character will have a certain degree of attachment with every feature. For example, a character of 'superman' may be described by features of 'strong', 'fast', 'alien', 'good', 'hope', etc. And the superman character has a degree of attachment of, e.g., 90% for strong, 95% for hope, 60% for alien, etc. This degree of attachment is basically how people will relate the fictional character with the keyword and can be derived by careful analysis of a story. Once the degree of attachment is obtained, it can be said that the character 'superman' can be represented by average of all the features. Since all the features are vectors obtained via word embedding model, so a vector representing the character can be obtained as SUPERMAN={0.9*V(strong)+0.95*V(hope)+0.6*V (alien)+ . . . }/{0.9+0.95+0.6+ . . . }. Once the vector representation of the fictional character is obtained, the distance between the characters can be calculated. Here, the distance between the characters may be the distance between the vector representations of the characters.

In an embodiment of the disclosure, the feature selector 226 may be configured to receive a user input as one of an audio input and a textual input. Furthermore, the feature selector 226 may be configured to select the one or more features from the fictional character info-graph based on the user input. In an embodiment of the disclosure, the one or more features may uniquely define the one or more fictional characters.

Moving forward, the emoticon generator 228 may be configured to generate the number of images upon receiving a multiple sets of features generated from the one or more features associated with the one or more fictional characters.

In an embodiment of the disclosure, the emoticon generator 228 may include the MLD GAN 232, the number of discriminators 234, the pre-trained info-graph 236, and the cost calculator 238. Moving forward, the MLD GAN 232 may be configured to receive the one or more features divided into the multiple sets of features. In an embodiment of the disclosure, the MLD GAN 232 may be configured to generate an image for each of the multiple set of features associated with the one or more fictional characters. In an embodiment of the disclosure, the image may be referred as a first image.

Continuing with the above embodiment of the disclosure, the MLD GAN 232 may be configured to transmit the first image to the number of discriminators 234. Upon receiving the first image, the number of discriminators 234 may be configured to generate an output value associated with each of the number of discriminators 234.

To that understanding, the number of discriminators 234 may be configured to determine a weight associated with each of the number of discriminators 234 based on a distance between each discriminator and the set of features. In a normal discriminator network, the weights for the feedback is set to 1. When the discriminator correctly or incorrectly classifies an input of the user, the feedback is provided back to the discriminator. However, in an embodiment of the disclosure, since the discriminators are localized, the discriminators should be better trained for the input so that the feedback is provided not in full but in ratio of a distance from features.

Furthermore, a weight update engine 240 may be configured to receive a distance of each discriminator from the set of features and generate an updated weight associated with the discriminator and the MLD GAN 232.

Furthermore, the first image may be passed to the pre-trained info-graph 236 by the number of discriminators 234. Upon receiving the first image, the pre-trained info-graph 236 may be configured to generate an image info-graph associated with the first image generated by the MLD GAN 232.

Moving ahead, the cost calculator 238 may be configured to calculate a relevance associated with each of the number of discriminators 234 based on the image info-graph, the set of features and the distance.

Upon calculation of the relevance, the MLD GAN 232 may be configured to generate a number of images representing a number of emoticons associated with the one or more fictional characters based on each of the multiple sets of features. Furthermore, the MLD GAN 232 may be configured to generate the one or more emoticons by styling one or more user images with respect to one or more images selected from the number of images, and one or more user specific inputs. In an embodiment of the disclosure, the MLD GAN 232 may be configured to select the one or more images from the number of images based on the output value of a discriminator associated with the one or more images from the number of discriminators 234. In an embodiment of the disclosure, the one or more user specific inputs may include a number of facial features, a facial tone, a hair color, a body built, a dressing style, one or more accessories associated with the one or more users. In an embodiment of the disclosure, styling the one or more user images comprises super-imposing the one or more images generated from the set of features associated with the one or more fictional characters onto the one or more user images and applying the one or more user specific inputs thereby generating the one or more emoticons.

In an embodiment of the disclosure, the cost calculator 238 may further be configured to calculate a confidence score associated with the number of discriminators 234 based on a number of parameters associated with each of the number of discriminators 234. In an embodiment of the disclosure, the number of parameters may include a weight, the output value, and the relevance associated with each of the number of discriminators 234. Furthermore, the cost calculator 238 may be configured to select remaining sets of features after generation of the first image based on the confidence score associated with the number of discriminators 234. In an embodiment of the disclosure, a set of features corresponding to a discriminator with a high relevance among the number of discriminators 234 is prioritized for selection.

Figure 3:
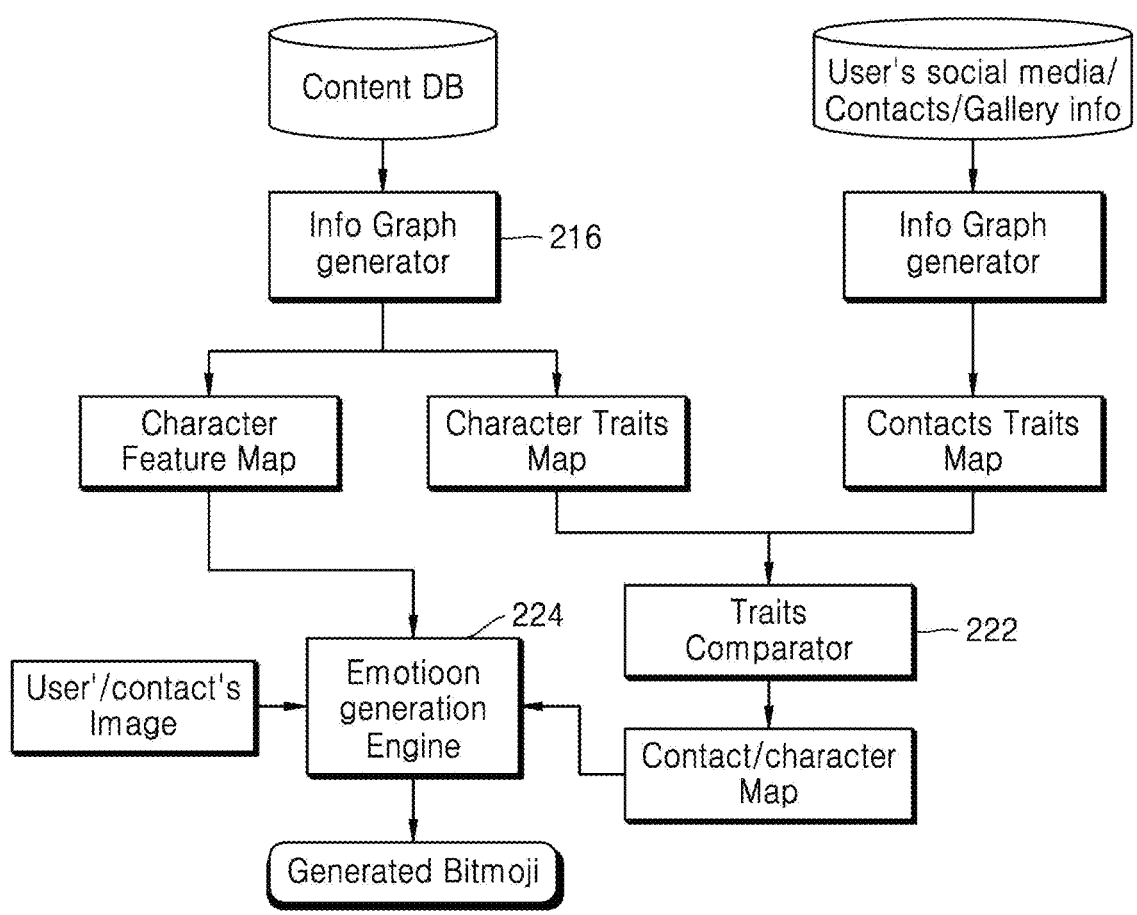
FIG. 3 illustrates an operational flow diagram depicting a method for generating one or more emoticons according to an embodiment of the disclosure.

FIG. 3 illustrates an operational flow diagram 300 depicting a method for generating one or more emoticons according to an embodiment of the disclosure.

Referring to FIG. 3, in an embodiment of the disclosure, the method may include enhancing a user's story experience by generating one or more emoticons for the user and one or more contacts associated with the user in a style of fictional characters belonging to the story. In an embodiment of the disclosure, the user and the one or more contacts may be one among the one or more user as referred in FIG. 2B. In an embodiment of the disclosure, the fictional characters may be referred to as one or more fictional characters as shown in FIG. 2B. The method may be configured to map one or more personality and behavioral traits of the characters to one or more personality and behavioral traits of the one or more users to generate avatars in a meaningful way. In an embodiment of the disclosure, the one or more emoticons may be based on the avatars.

In an embodiment of the disclosure, the method may include creating an info-graph of the traits and the physical features of the characters. Further, the method may include matching the info-graph associated with the character with an info-graph of the one or more users using a social media activity and a chat information of the one or more users. In an embodiment of the disclosure, the info-graph associated with the character may be referred as the one or more fictional character and the info-graph associated with the one or more users may be referred as a use info-graph as referred in FIG. 2B.

Upon mapping, corresponding emoticons from the one or more emoticons may be generated using the MLD GAN 232 along with the genetic algorithm. Furthermore, a relevance of each discriminator may be dynamically calculated to incorporate features from required clusters and enhance generated population of the one or more emoticons. In an embodiment of the disclosure, each discriminator may be related to a cluster. Furthermore, each of the discriminators may be referred as the number of discriminators 234 as referred in FIG. 2B. The generated character-styled one or more emoticons may be used as one or more of stickers, GIFs, and wallpapers.

Figure 4:
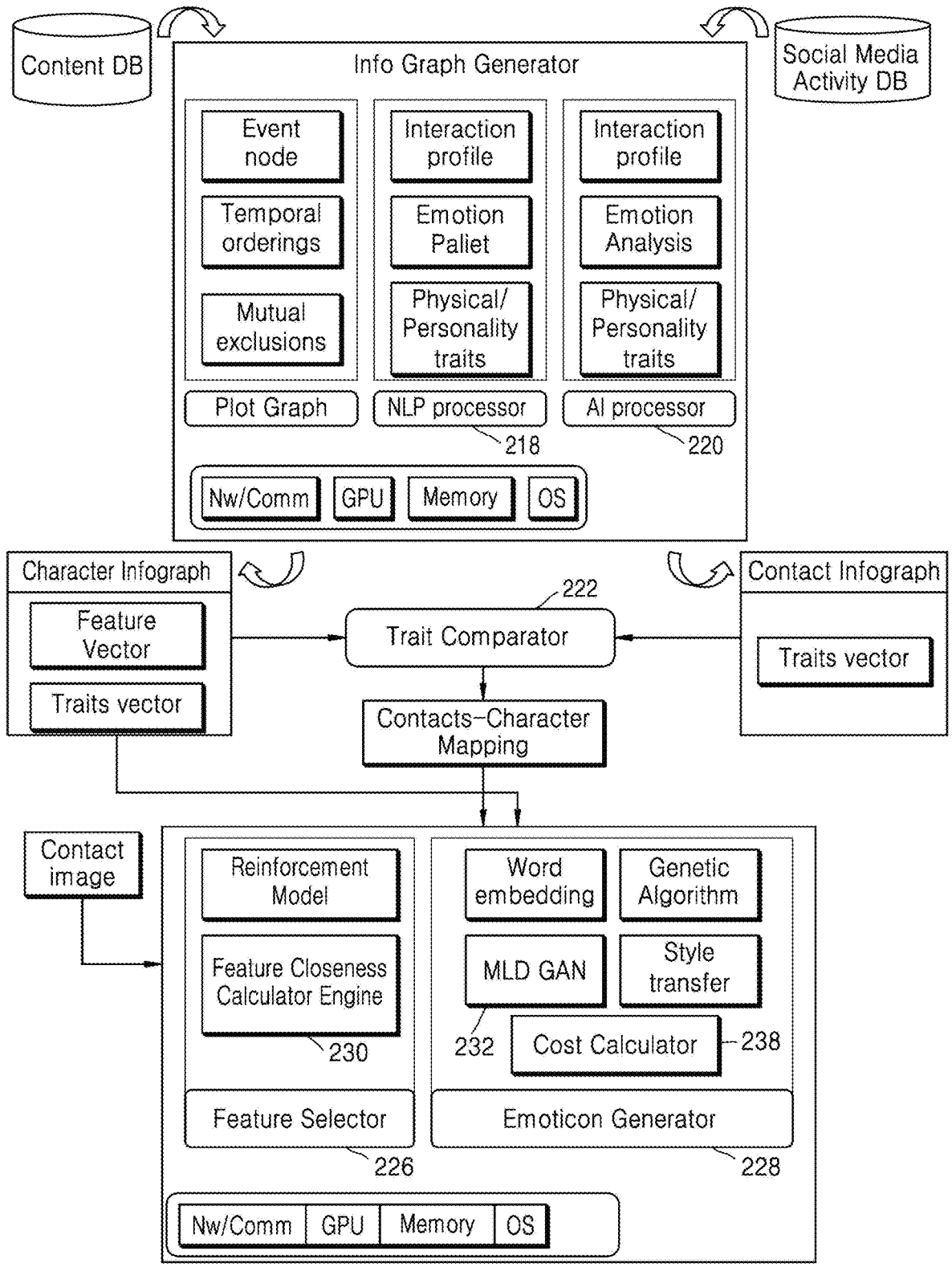
FIG. 4 illustrates an architecture depicting a method for generating one or more emoticons for one or more users with respect to one or more fictional characters according to an embodiment of the disclosure.

FIG. 4 illustrates an architecture depicting a method for generating one or more emoticons for one or more users with respect to one or more fictional characters according to an embodiment of the disclosure.

Referring to FIG. 4, the method may be configured to generate the one or more emoticons through the MLD GAN 232 and a genetic algorithm.

In an embodiment of the disclosure, an architecture 400 may include the info-graph generator 216, a contacts-character mapping and an emoticon generation module. In an embodiment of the disclosure, the contacts-character mapping may be a mapping between the one or more fictional characters and the one or more users. In an embodiment of the disclosure, the characters may be the one or more fictional characters as referred in FIG. 2B and the contacts may be referred as the one or more users.

Furthermore, the info-graph generator 216 may be configured to create a word-embedding for the physical and personality traits for the character and the contact of the user. In an embodiment of the disclosure, the physical and personality traits associated with the character may be referred as a number of features and the physical and personality traits associated with the contact may be referred as a number of attributes as referred in FIG. 2B.

Generation of a fictional character info-graph includes extraction of content data, such as textual data, audio data and visual data from a content database. Generation of the fictional character info-graph further includes creation of a plot graph by representing a story as combination of separate narratives and an interaction between the characters based on events in the story.

Generation of the fictional character info-graph further includes using an NLP processor 218 to determine the interaction profile of the character with other characters based on a dialogue exchange and an event correlation. In an embodiment of the disclosure, the NLP processor 218 may be referred as the NLP processor 218 as referred in FIG. 2B. The NLP processor 218 may also create an emotion palette for the character based on the dialogues present in the content. From the content, physical characteristics of the character may be separated out.

Generation of the fictional character info-graph includes receiving content data present in a visual form to create the interaction profile, emotion palette and physical/personality traits for the character by the AI processing engine.

Generating a user info-graph may include extraction of a social media activity and chats amongst the one or more users. Generating the user info-graph may include using the NLP processor 218 to assess a type of relationship with user based on a mutual sharing, comments and chats amongst the one or more users. Generating a user info-graph may include using the NLP processor 218 to create a psychological profile of the contact based on social media posts and comments. The psychological profile may be information about the psychological traits of the contact, which can be obtained by an analysis of the interactions between the user and the contacts. The psychological profile may include, but not limited to, features such as 'influencer', 'suspicious,', 'mentally strong', 'self-doubtfulness', etc. Further, generating the user info-graph may include receiving gallery information of the user to create a personality profile of the contact by the AI processing engine. The gallery information may include a collection of moving pictures and/or still pictures stored in the user's device.

Moving forward, the architecture 400 may include a contact character map calculator configured to compare a feature word embedding of the characters and the contacts generated from the info-graph generator 216. Further, the contact character map calculator may be configured to map the characters to the contacts whose personality traits vector are closest to one another other. Further, the mapping may be used to generate the one or more emoticons for the contacts in style of a certain character.

Furthermore, the architecture 400 may include the emoticon generator engine 224 configured to receive the character and the contacts info-graph containing a word embedding representing the physical characteristics and the personality traits for the contact and the associated character. The one or more emoticon generation process may be based on the feature selector 226 and the emoticon generator 228.

The feature selector 226 may receive an 'N' dimensional vector V={v1, v2, v3, . . . , vn} representing the word embedding of the physical characteristics of the contacts in style of which the one or more emoticons is to be generated. The N dimensional vector space may be filled with various words. The feature selector 226 may be configured to select a user preferred 'K' features ('K' clusters or 'K' groups) from an 'N' dimensional vector such that the features selected may uniquely distinguish the character from the cast. At least one point of reference for each cluster corresponding to each features is assigned. For example, C point for C cluster corresponds to C feature—e.g., smart. Each discriminator is placed in each point of reference for each cluster. Thus, K discriminators are assigned to K clusters and each discriminators may classify the images in its cluster better as compared to the images outside the cluster because when the discriminators are trained, the weights of discriminator may be updated in such a way that the discriminator's weight becomes affected more by the correct or incorrect classifications of images placed near to the discriminator than the classifications of images far from the discriminator. In an embodiment of the disclosure, the 'K' features may be one or more features as referred in FIG. 2B. Further, the cast may be one of the one or more fictional characters. The feature selector 226 may preserve a closeness ratio to determine features of a specific character resembling another character in the story.

Further, the emoticon generator 228 may receive a set of physical features of the character and one or more images of the contact for which an avatar is to be created. The emoticon generator 228 may first generate the one or more emoticons of the character based on the features selected by a first representing the word-embedding in a N-Dimensional space and using a fusion of the MLD GAN 232 with a genetic algorithm-based model including multiple discriminators to generate the one or more emoticons of the character with the selected features. The one or more emoticons may be passed to a cycle GAN with the one or more images of the contact to generate the one or more emoticons of the contact in style of a given character.

Figure 5:
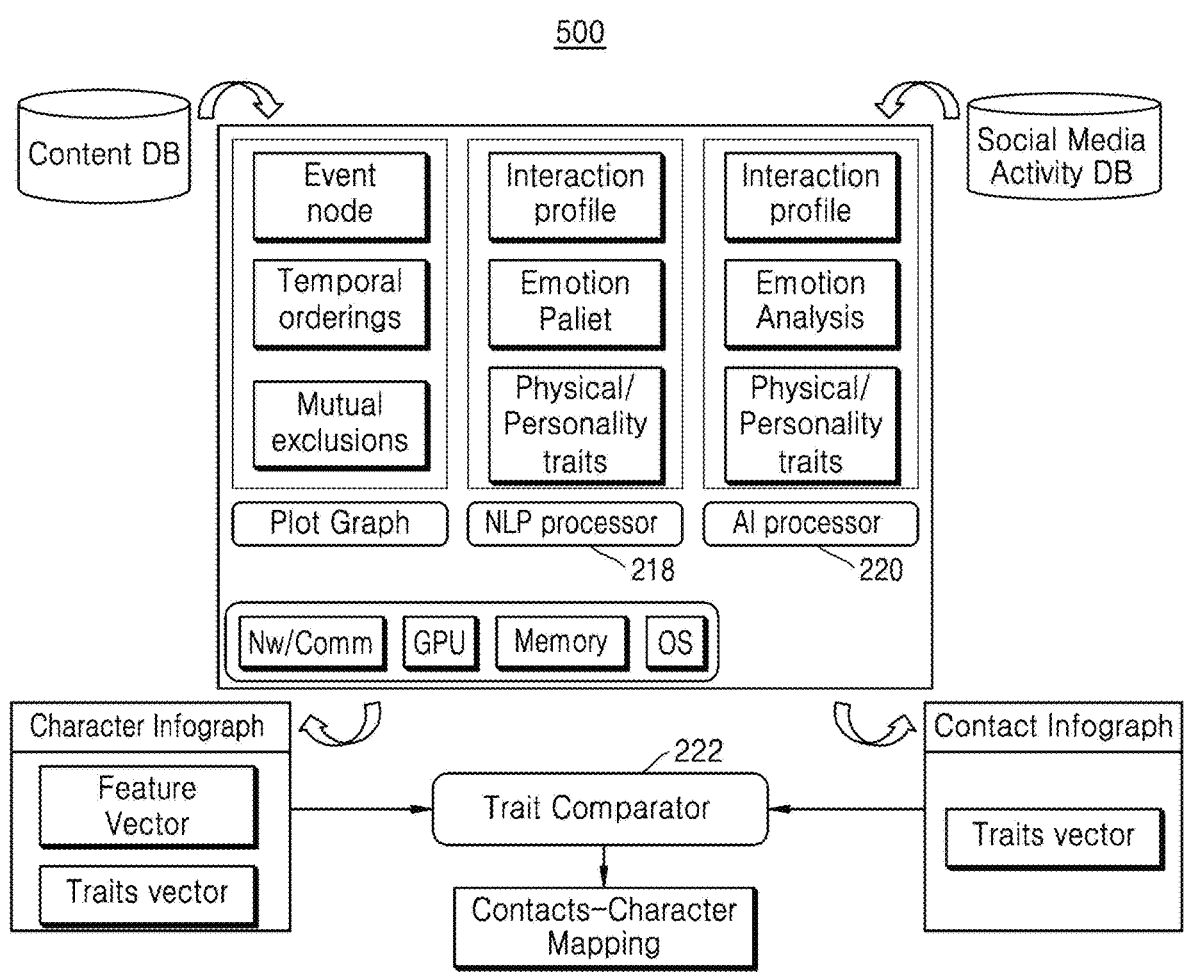
FIG. 5 illustrates an architectural diagram depicting the info-graph generator according to an embodiment of the disclosure.

FIG. 5 illustrates an architectural diagram 500 depicting the info-graph generator 216 according to an embodiment of the disclosure.

Referring to FIG. 5, in an embodiment of the disclosure, the info-graph generator 216 may be configured to create a word embedding for a number of physical and personality traits for the characters and contacts. In an embodiment of the disclosure, the number of physical and personality traits may be obtained based on one or more of a textual data, an audio data and a visual data extracted from a database. In an embodiment of the disclosure, the character may be amongst one or more fictional characters and the contact may be amongst one or more users as referred in FIG. 2B. In an embodiment of the disclosure, the number of physical and personality traits related to the character may be a number of features as referred in FIG. 2B. Further, the number of physical and personality traits related to the contact may be a number of attributes as referred in FIG. 2B. Furthermore, the word embedding related to the character may be the fictional character info-graph and the word embedding related to the user may be a user info-graph as referred in FIG. 2B. Furthermore, for generating the word embedding of the character, the info-graph generator 216 may receive a textual description present in one or more of a content, one or more dialogues, one or more facial expressions based on events to create a personality profile for the character.

For generation of word embedding of the personality traits of the contact, the info-graph generator 216 may fetch social media activity data including a content shared publicly, and a content shared with users amongst the one or more users, and comments on social media posted by the contact and an interaction of the contact with the user and a personal chat information of the contact.

In an embodiment of the disclosure, the info-graph generator 216 may be configured to generate a plot graph. In an embodiment of the disclosure, the plot graph may be a compact representation of a space of one or more possible stories describe a certain scenario associated with the one or more fictional characters. In an embodiment of the disclosure, the plot graph may be configured to separates one or more individual narratives of a character from the content database including events encountered by the character, temporal orderings of the events and mutual exclusions. In an embodiment of the disclosure, the mutual exclusions may be one or more scenarios unable to take place in a similar story. If the activities of a user are monitored and mapped sequentially or the activities of a fictional character are mapped to a story, then this monitored or mapped activities may form a graph which will show transitions from one state to another. This plot graph may depict transitions from one state to another or put simply from one activity to another.

In an embodiment of the disclosure, the event nodes may be one or more vertices of the plot graph. Each of the nodes represents one event. Further, each node may include a set of sentences semantically describing the event learned from one or more crowdsourced exemplar stories.

Moving ahead, the temporal orderings may be one or more unidirectional edges of the plot graph. The temporal orderings may be a partial ordering indicating a necessary order for the events in the story. In an embodiment of the disclosure, if an event A is ordered before an event B, the event B may not occur until the event A has occurred in the story.

Continuing with the above embodiment of the disclosure, the mutual exclusions may be one or more bidirectional edges of the plot graph. In an embodiment of the disclosure, the mutual exclusions may indicate situations two events being unable to take place in the similar story.

In an embodiment of the disclosure, the info-graph generator 216 may further include a natural language processing (NPL) system. In an embodiment of the disclosure, the NLP processor 218 may be configured to analyze one or more dialogue exchanges with other characters and other contacts and interactions with the other characters and the contacts with respect to the event nodes of the plot graph for each node of the plot graph for the character and the contact. Furthermore, the NLP processor 218 may be configured to determine a number of characteristics associated with the character and the contact.

In an embodiment of the disclosure, the number of characteristics include an interaction profile, an emotional profile, and one or more physical and personality traits. Furthermore, the interaction profile may be extracted from the event nodes shared by two or more characters and contacts. The interaction profile of the character may give an overview of a relation with other characters and contacts. From the event nodes, the personality of the character and the contact may be extracted.

Continuing with the above embodiment of the disclosure, the emotional pallet may focus on creating an emotional pallet for the character and the contact describing a level of expression of a particular emotion while experiencing one or more of a certain situation and an interaction with the other character and contact.

Moving forward, the physical traits of the character may be determined from the textual description provided from the plot graph of a certain character. The personality traits may be determined from the interaction profile and the emotion pallet of the character and the contact.

In an embodiment of the disclosure, the info-graph generator 216 may further include an AI processor 220. In an embodiment of the disclosure, the AI processor 220 may be configured to parse the audio and the visual input to a textual form further provided to the NLP processor 218 to determine the interaction profile, the emotional profile, and the one or more physical and personality traits. Using a combination of the AI processor 220 and the NLP processor 218 with the plot graph, a word embedding vector describing the personality and physical traits of the character and the contact may be created.

Furthermore, the info-graph generator 216 may include a contact character map calculator configured to determine a contact suitable to be mapped to a character using the traits comparator as referred in FIG. 2B. The trait comparator 222 may be configured to calculate a distance between a traits vector of the character with the one or more users to create a mapping of the one or more users to the character in the style associated with one or more avatars may be generated. In an embodiment of the disclosure, the one or more avatars may be based on the one or more fictional characters.

Figure 6:
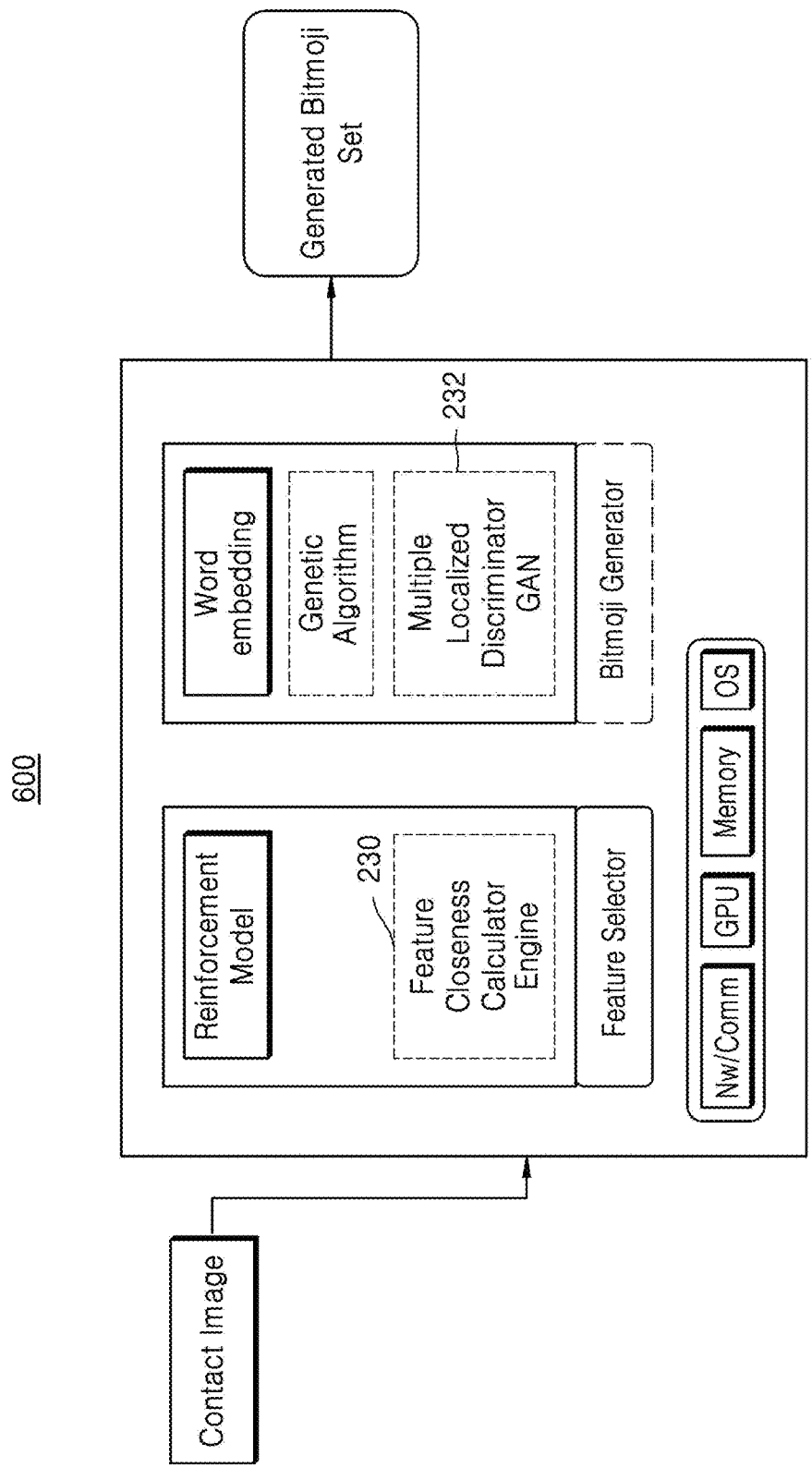
FIG. 6 illustrates an architectural diagram depicting an emoticon generator engine according to an embodiment of the disclosure.

FIG. 6 illustrates an architectural diagram 600 depicting an emoticon generator engine 224 according to an embodiment of the disclosure.

Referring to FIG. 6, in an embodiment of the disclosure, the emoticon generator engine 224 may be configured to generate one or more emoticons for one or more users. In an embodiment of the disclosure, the one or more emoticons may be developed in a style of some fictional character. In an embodiment of the disclosure, the fictional character may be amongst one or more fictional characters as referred in FIG. 2B.

Continuing with the above embodiment of the disclosure, the emoticon generator engine 224 may include the feature selector 226 and the emoticon generator 228. Furthermore, the feature selector 226 may include a feature closeness calculator module. In an embodiment of the disclosure, the feature closeness calculator module may be a reinforcement-based model with an objective to select user preferred 'K' features from a 'N' dimensional vector. In an embodiment of the disclosure, the 'K' features may be the one or more features amongst the number of features. In an embodiment of the disclosure, the 'K' features selected may be capable to uniquely distinguish the one or more fictional characters from one another.

In continuation with above embodiment of the disclosure, the emoticon generator 228 may be configured to generate the one or more emoticons associated with the one or more users. In an embodiment of the disclosure, the emoticon generator 228 may include the MLD GAN 232 aimed at generating a number of images for the one or more fictional characters based on a genetic algorithm with the MLD GAN 232 to generate the number of images for an unknown character based on characteristics related to the unknown character. In an embodiment of the disclosure, the unknown character may be amongst the one or more fictional characters. Furthermore, the characteristics may be the one or more features related to the one or more fictional characters.

Figure 7:
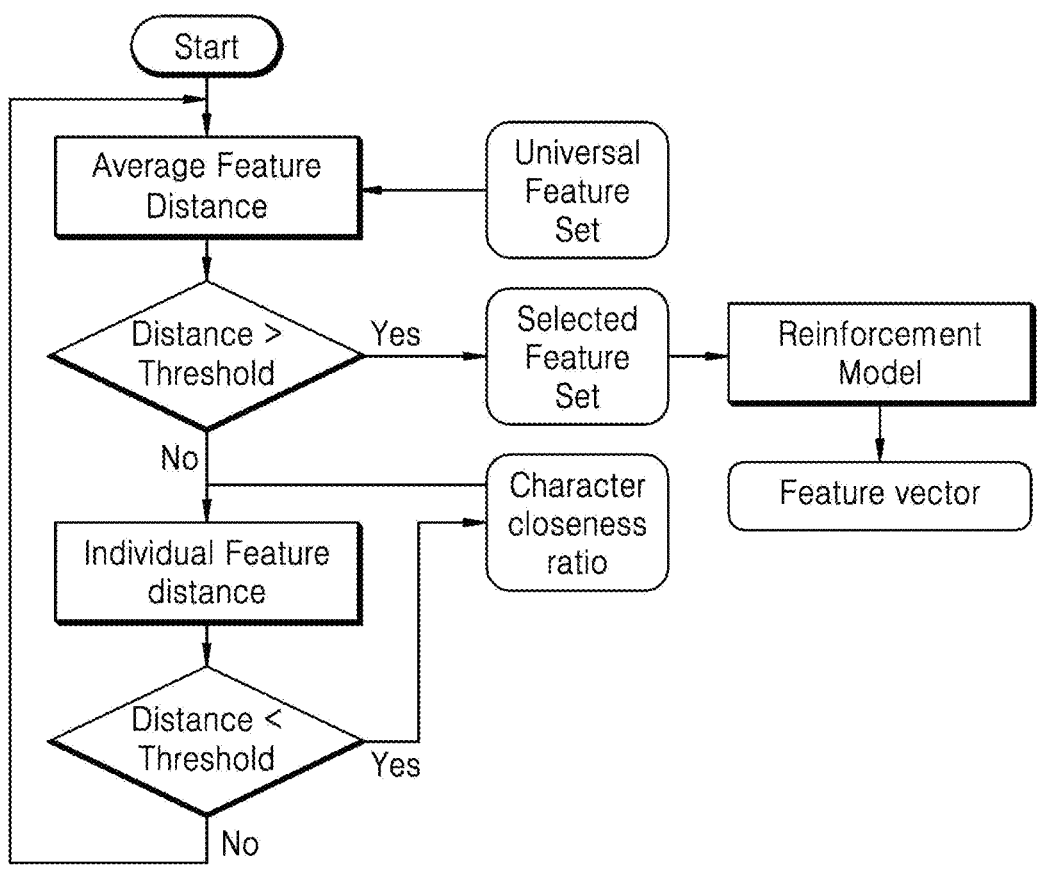
FIG. 7 illustrates an operational flow diagram depicting a process for selecting one or more features associated with one or more fictional characters according to an embodiment of the disclosure.

FIG. 7 illustrates an operational flow diagram 700 depicting a process for selecting one or more features associated with one or more fictional characters according to an embodiment of the disclosure.

Referring to FIG. 7, in an embodiment of the disclosure, the one or more features may be selected from a number of features associated with the one or more fictional characters.

In an embodiment of the disclosure, the one or more features may be selected by the feature selector 226 as referred in FIG. 2B.

Continuing with the above embodiment of the disclosure, the process may include, receiving, by the feature selector 226 an N dimensional vector representing one or more identifiable physical features related to the one or more fictional characters. In an embodiment of the disclosure, the N dimensional vector may be a fictional character info-graph as referred in FIG. 2B.

Further, the process may include selecting a set of 'K' features suiting one or more users such that the set of 'K' features is distinguishable as the one or more fictional characters. In an embodiment of the disclosure, the set of 'K' features may be referred as the one or more features.

Moving forward, the process may include performing selection of the 'K' features from the number of features based on a user preference such that a number of objectives are satisfied. In an embodiment of the disclosure, the number of objectives may include the set of 'K' features is enough to distinguish the character from other characters in a narrative. In an embodiment of the disclosure, the characters may be amongst the one or more fictional characters. Further, the set of 'K' features selected for style transfer may abide the user preferences for a given contact. In an embodiment of the disclosure, the one or more given contact may be amongst the one or more users.

In an embodiment of the disclosure, a universal set of features for a character 'C' may be Fc={$Fc_1$, $Fc_2$, $Fc_3$, ... } and a character closeness ratio be R={1, 1, 1, ... } initially. Further, for every feature (Fi), add features to feature set (Fs) if $\Sigma(fc-fci)^2/N > T$. Further, if $(fc-fc_i)^2 < T$, $R_i = 2*R_i$, for the number of features in Fc, add feature Fi if $(fc-fci)^2 > R_i*T$. In an embodiment of the disclosure, "T" may be referred as a pre-determined threshold. Further, passing the Feature List (Fs) to a reinforcement learning model to fetch the user preferences. In an embodiment of the disclosure, the reinforcement module may be the reinforcement module as referred in FIG. 6.

Figure 8:
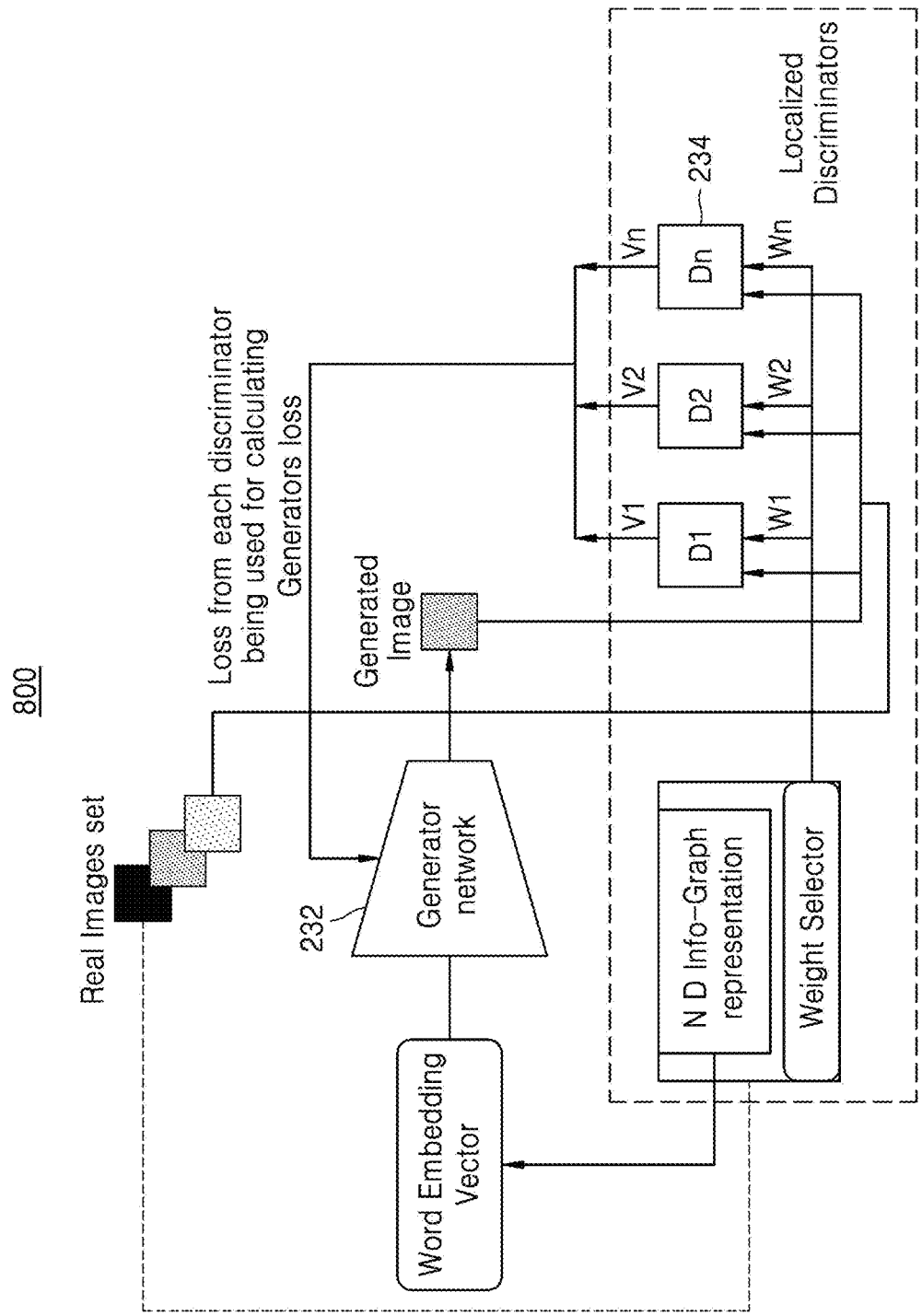
FIG. 8 illustrates an operational flow diagram depicting a process for generating a number of images associated with one or more emoticons according to an embodiment of the disclosure.

FIG. 8 illustrates an operational flow diagram 800 depicting a process for generating a number of images associated with one or more emoticons according to an embodiment of the disclosure.

Referring to FIG. 8, in an embodiment of the disclosure, the one or more emoticons may be generated with respect to one or more fictional characters. Furthermore, the one or more fictional characters may be based on one or more of a story, a conversation, a textual input, and a voice input. In an embodiment of the disclosure, the process may include generation of an info-graph by putting all the character and characteristics in an N dimensional word embedding space. In an embodiment of the disclosure, the info-graph may be the fictional character info-graph associated with the one or more fictional characters as referred in FIG. 2B. In an embodiment of the disclosure, the process may utilize localized discriminators for generating the one or more emoticons. In an embodiment of the disclosure, the localized discriminators may be the number of discriminators 234 as referred in FIGS. 2A and 2B. Each of the number of discriminators 234 may be configured to identify a specific type of images amongst a number of images.

In an embodiment of the disclosure, where a word embedding model includes N dimensions, N clusters in complete word embedding space along with a discriminator $D_i$ locally for each cluster (i) are created.

In an embodiment of the disclosure, the MLD GAN 232 may receive a noise—feature vector—as an input and create an image I for training. In an embodiment of the disclosure, the noise may be an attribute vector, such as one or more features amongst a number of features associated with the one or more fictional characters. Further, the image I may be passed to each of the number of discriminators 234 such that each discriminator (Di) may produce an output value (Vi). The output value (Vi) may denote the classification of the generated image as real for fake. Thus, (Di) produces (Vi).

Further, for weight updating part, a weight update engine 240 may receive a distance of each discriminator (Di) from the noise and generate an updated weight associated with the discriminator and the MLD GAN 232. The weight update engine 240 may measure the distance of Di from the noise input. since every discriminator belongs to certain cluster in the input space. Thus, the discriminator may be represented as a point in the N dimensional graph. I.e., every discriminator will have a vector representing its position in the input space. The noise input is the feature vector in this case. The weight update engine 240 may update the weight of both of discriminator Di and the generator. Here, the distance between the discriminator and the noise input means the distance between the vector representation of the discriminator and the input feature vector. Furthermore, each discriminator network may be configured to assess a generated image also referred as the image I with respect to the properties of a corresponding cluster. Further, the weight may be updated in proportion to a relevance with the noise.

In an embodiment of the disclosure, the weight assigned to a discriminator Di, is Wi based on the distance from the noise input, the weight update for the Di is done based on a loss L[Di]=Wi*Vi. The longer the distance between the discriminator and the feature vector, the less is the weight W. Furthermore, a combined average may be used for the MLD GAN 232 calculated by the equation mentioned below:

$$L[G] = \lambda * \Sigma_{i=1}^{n} (Wi*Vi)/(Wi) \qquad \text{Equation 1}$$

Figure 9:
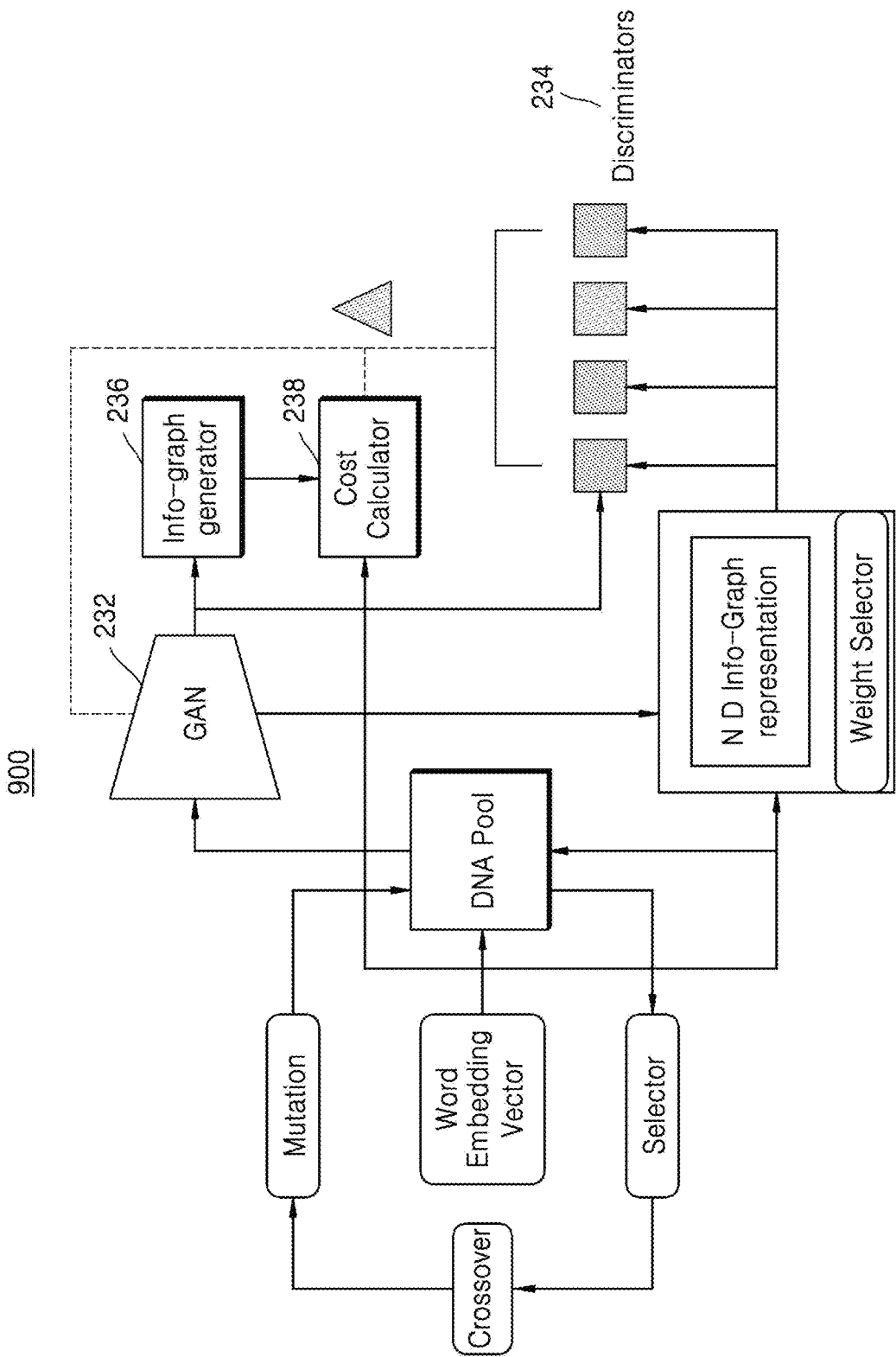
FIG. 9 illustrates an operational flow diagram depicting a process for generating one or more emoticons based on a genetic algorithm and the multiple localized discriminator (MLD) generative adversarial network (GAN) according to an embodiment of the disclosure.

FIG. 9 illustrates an operational flow diagram 900 depicting a process for generating one or more emoticons based on a genetic algorithm and the MLD GAN 232 according to an embodiment of the disclosure.

Referring to FIG. 9, initially, an info-graph may be generated by putting all the character and characteristics in an N dimensional word embedding space. In an embodiment of the disclosure, the info-graph may be the fictional character info-graph associated with the one or more fictional characters as referred in FIG. 2B.

In reference to the genetic algorithm, each attribute may be referred as a gene. In an embodiment of the disclosure, the attribute may be the attribute vector as referred in FIG. 8. Furthermore, a combination of K attributes may be referred as a chromosome such that each chromosome may be the input to the MLD GAN 232. Further, a combination of the chromosomes may be referred as a population. In an embodiment of the disclosure, the gene, the chromosomes, and the population may be stored at a DNA pool.

In an embodiment of the disclosure, T may be a text embedding representing the K attributes to be included in avatar image, wherein T={t1, t2, ..., tk}. In an embodiment of the disclosure, the K attributes may also be referred as K features.

In an embodiment of the disclosure, the process may include generating a number of different inputs to be fed into the MLD GAN 232 by combining the K attributes out of N features in some random manner. In an embodiment of the disclosure, the K features may be referred as the one or more features and the N features may be the number of features as referred in FIG. 2B. In an embodiment of the disclosure, a group of a number of inputs may generate a generation one of images. In an embodiment of the disclosure, the generation one of images may be based on the number of images.

For every input in the form of the chromosome in a generation GQ for generating the number of images, an image may be created using a generator network of the MLD GAN 232 model. Upon generation, the image may be passed through N discriminator networks. In an embodiment of the disclosure, the N discriminator networks may be the number of discriminators 234 as referred in FIG. 2B. In an embodiment of the disclosure, a result of a discriminator amongst the number of discriminators 234 may be Vi. In an embodiment of the disclosure, the result may indicate whether the image is real or fake with respect to a corresponding cluster of each discriminator network. Further, the weight may be provided to each discriminator as Wi by determining the distance of the input feature vector T with the discriminator Di.

Continuing with the above embodiment of the disclosure, an output image of the MLD GAN 232 for every C chromosome may be fed into a pre-trained info-graph 236 generator 216 [CNN model]. The info-graph generator 216 may be configured to generate a text embedding from the image, such that the embedding may be T'={t1', t2', ..., tk'}.

In continuation with the above embodiment of the disclosure, the embedding T' may be passed to the cost calculator 238 as referred in FIG. 2B. In an embodiment of the disclosure, the cost calculator 238 may be configured to create a relevance associated with the output image. In an embodiment of the disclosure, the relevance may be calculated based on the equation mentioned below:

$$\text{Relevance} = \Sigma_{i=1}^{k}(\text{distance}(ti,ti'))/(K) \quad \text{Equation 2}$$

Furthermore, the process may include generating a confidence score such that the confidence score is an indicator of a quality. Furthermore, the confidence score may be used select chromosomes for making a next generation of images for generating the number of images. In an embodiment of the disclosure, the confidence score may be defined as a composite of discriminator results associated with the number of discriminators 234 and the relevance calculated above. Further, the confidence score may be calculated based on the equation mentioned below:

$$\text{Confidence} = \lambda_1 *(W_1 V_1 + W_2 V_2 + \ldots + W_3 V_3) + \lambda_2 * \text{Relevance} \quad \text{Equation 3}$$

Furthermore, for every input of generation 1 of the images for generating the number of images, a tuple including the input noise, such as the chromosome, the image, and the confidence score may be present.

For generating a second generation, a number of rules associated with the genetic algorithm may be applied. In an embodiment of the disclosure, the number of rules may include selecting top C/2 chromosomes for next generation from the number of chromosomes. In an embodiment of the disclosure, the C/2 chromosomes may be the chromosomes used as the input for the number of discriminators 234 with a highest confidence score amongst one another.

Further, the number of rules may include selecting top C/4 chromosomes upon changing one or more genes from the number of chromosomes forming a mutated setting.

Continuing with the above embodiment of the disclosure, the number of rules may include selecting top few chromosomes and making crossovers between the few chromosomes and selecting the top C/4 chromosomes of the crossovers. Furthermore, the second generation may be further evaluated, and a third generation may be obtained from the number of chromosomes. Further, the process may repeat for multiple times generating G generations of images. In an embodiment of the disclosure, the G generations of images may constitute the number of images.

Further after G generations, a set of C noise inputs or chromosomes generating best images of the one or more fictional character may be used. A user may select one of the number of images for the one or more fictional characters. By default, an image with a best discriminator score may be selected.

Figure 10:
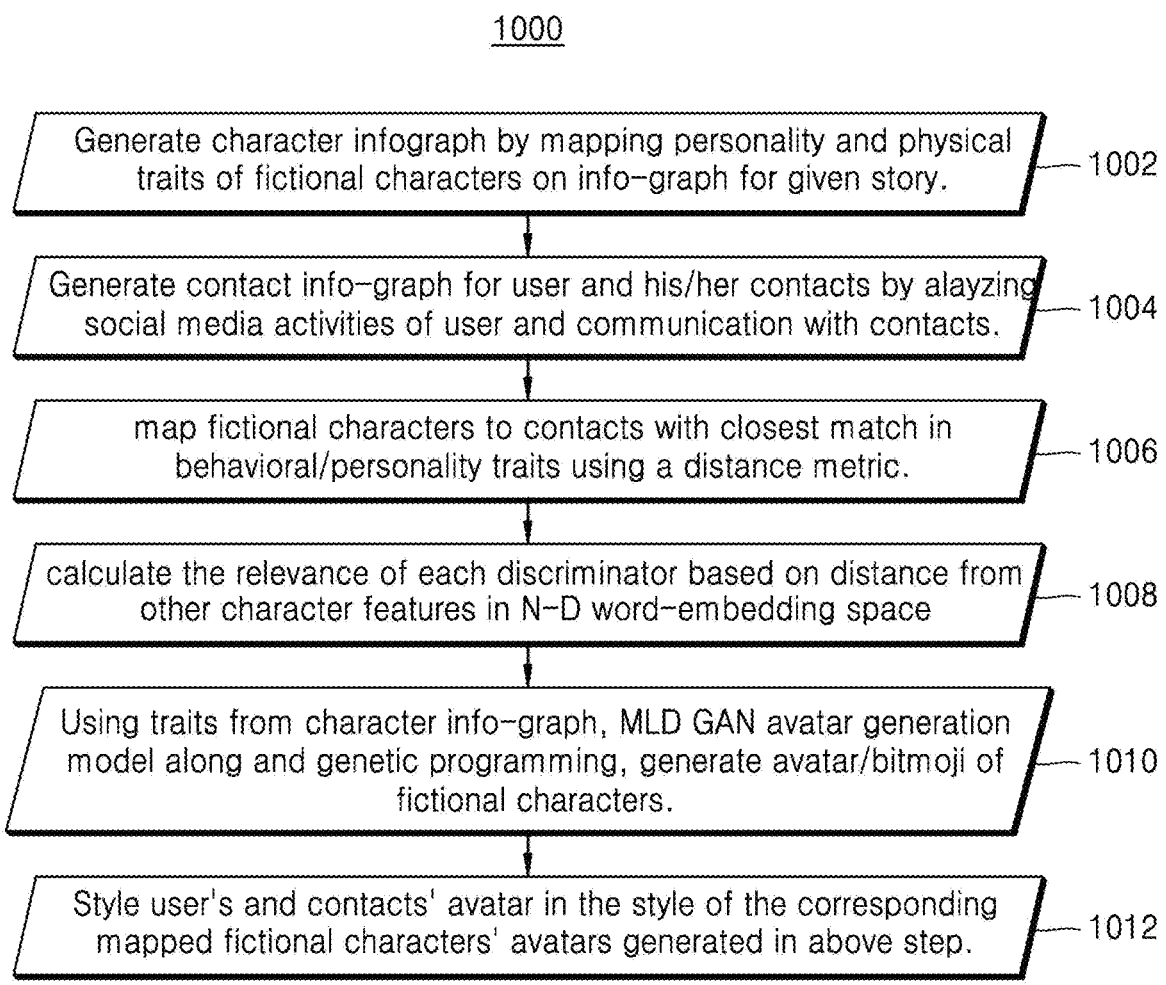
FIG. 10 illustrates an operational flow diagram depicting a process for generating one or more emoticons for one or more users with respect to one or more fictional characters according to an embodiment of the disclosure.

FIG. 10 illustrates an operational flow diagram 1000 depicting a process for generating one or more emoticons for one or more users with respect to one or more fictional characters according to an embodiment of the disclosure.

Referring to FIG. 10, in an embodiment of the disclosure, the one or more emoticons may be generated based on the number of discriminators 234 and the MLD GAN 232. Further, the one or more emoticons may be based on a relevance score and a confidence score associated with the number of discriminators 234.

At operation 1002, the process includes, generating a character info-graph by mapping personality and physical traits of one or more fictional characters on an info-graph for a story. In an embodiment of the disclosure, the character info-graph may be a fictional character info-graph as referred in FIG. 2B. Furthermore, the personality and physical traits of the one or more fictional characters may be the number of features of the one or more fictional characters.

At operation 1004, the process includes generating a contact info-graph for the one or more users by analyzing social media activities of the one or more users and communication amongst the one or more users. In an embodiment of the disclosure, the contact info-graph may be a user info-graph as referred in FIG. 2B.

At operation 1006, the process includes mapping the one or more fictional characters to the one or more users with closest match in the behavioral traits and the personality traits using a distance metric.

At operation 1008, the process includes calculating the relevance of each discriminator based on the distance from a set of features in an N-D word-embedding space.

At operation 1010, the process includes generating an avatar of fictional characters using traits from the character info-graph, the MLD GAN 232 and the genetic programming. In an embodiment of the disclosure, the avatar may be one or more emoticons.

At operation 1012, the process includes styling the avatar associated with the one or more users and the one or more fictional characters in a style of corresponding mapped fictional characters' avatars generated in operation 1010.

Figure 11:
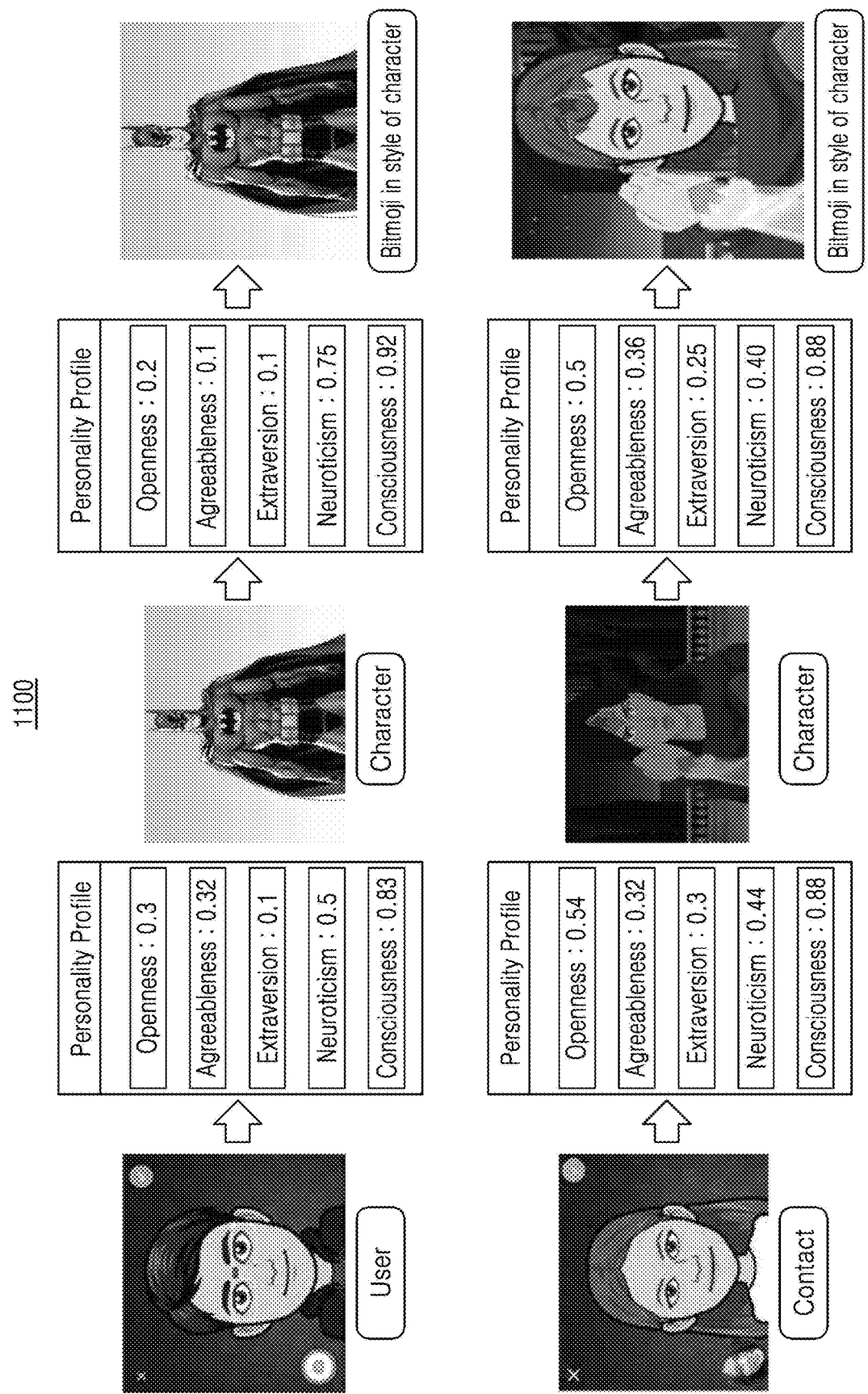
FIG. 11 illustrates a use case depicting generation of one or more emoticons in style of one or more fictional character based on personality traits according to an embodiment of the disclosure.

FIG. 11 illustrates a use case 1100 depicting generation of one or more emoticons in style of one or more fictional character based on personality traits according to an embodiment of the disclosure.

Referring to FIG. 11, in an embodiment of the disclosure, the personally trait may be the number of features associated with the one or more fictional characters.

Figure 12:
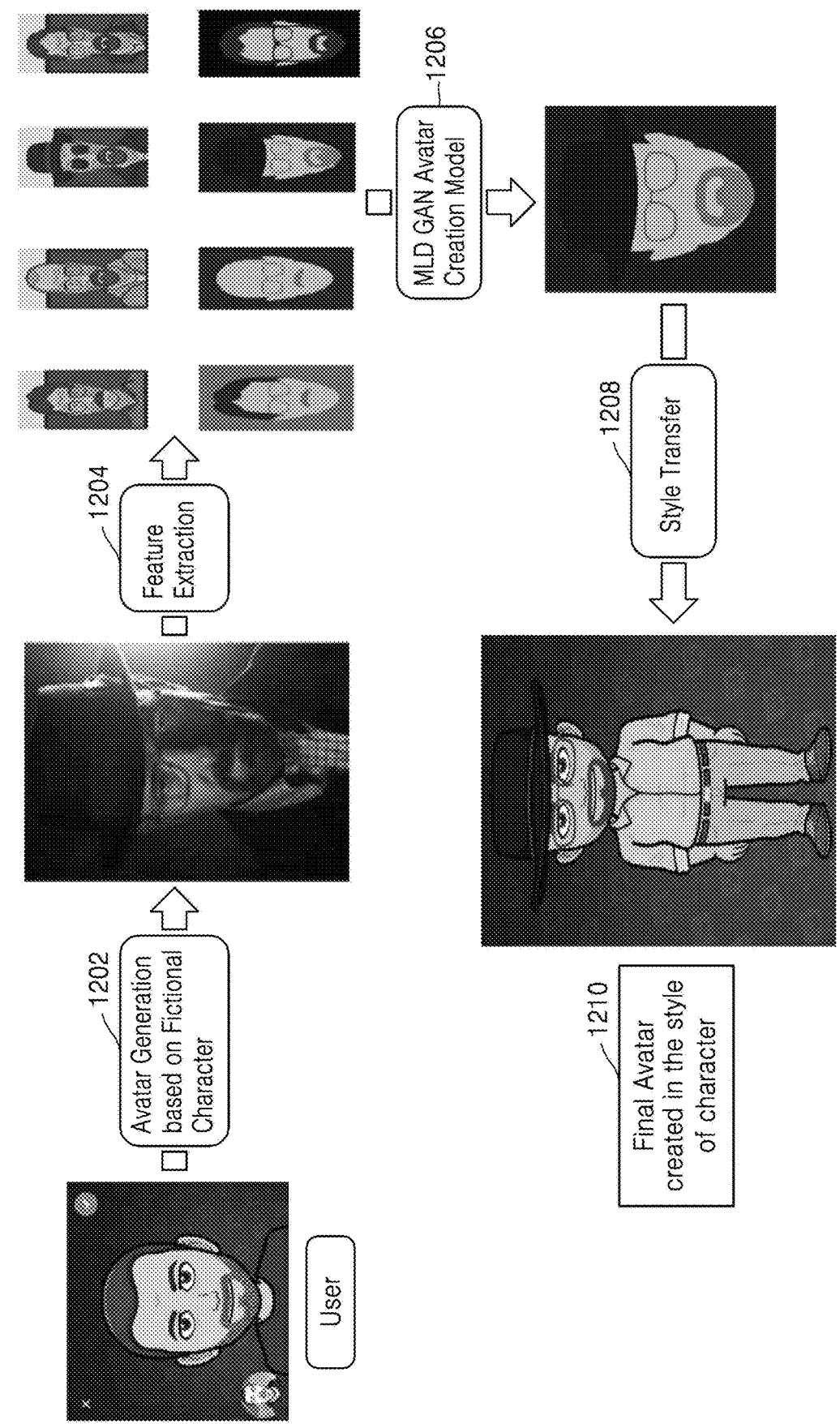
FIG. 12 illustrates a use case depicting generation of one or more emoticons in style of one or more fictional character according to an embodiment of the disclosure.

FIG. 12 illustrates a use case 1200 depicting generation of one or more emoticons in style of one or more fictional character according to an embodiment of the disclosure.

Referring to FIG. 12, at operation 1202, an avatar may be generated based on fictional characters.

At operation 1204, a number of features may be extracted associated with the fictional character.

At operation 1206, an image may be created based on MLD GAN 232 avatar creation model. In an embodiment of the disclosure, the MLD GAN 232 avatar creation model may be the MLD GAN 232.

At operation 1208, a styling of the image may be performed.

At operation 1210, a final avatar may be created in the style of character.

FIG. 13A illustrates an application use case 1300a depicting generation wallpapers and screensavers in style of one or more fictional characters based on personality traits according to an embodiment of the disclosure.

Referring to FIG. 13A, in an embodiment of the disclosure, the personally trait may be the number of features associated with the one or more fictional characters. In an embodiment of the disclosure, the wallpapers and the screensavers may be generated for one or more of a single user and a group of friends. In an embodiment of the disclosure, the single user and the group of friends may be amongst one or more users. Wallpapers may be provided such that the user remains connected to the story even in absence of new episodes and new books. In an embodiment of the disclosure, the wallpaper and the screen savers may depict a glimpse of upcoming plot.

FIG. 13B illustrates an application use case 1300b associated with one or more chat wallpapers according to an embodiment of the disclosure.

Referring to FIG. 13B, in an embodiment of the disclosure, the chat Wallpapers may be generated for one or more of a contact and a group of friends. In an embodiment of the disclosure, the contact and the group of friends may be amongst one or more users. The chat wallpapers for individual contact and even group depicts a kind of bond and experiences shared by one or more fictional characters. The chat wallpapers changing dynamically with story plot depicts a kind of dynamics between the one or more fictional characters.

Figure 14A:
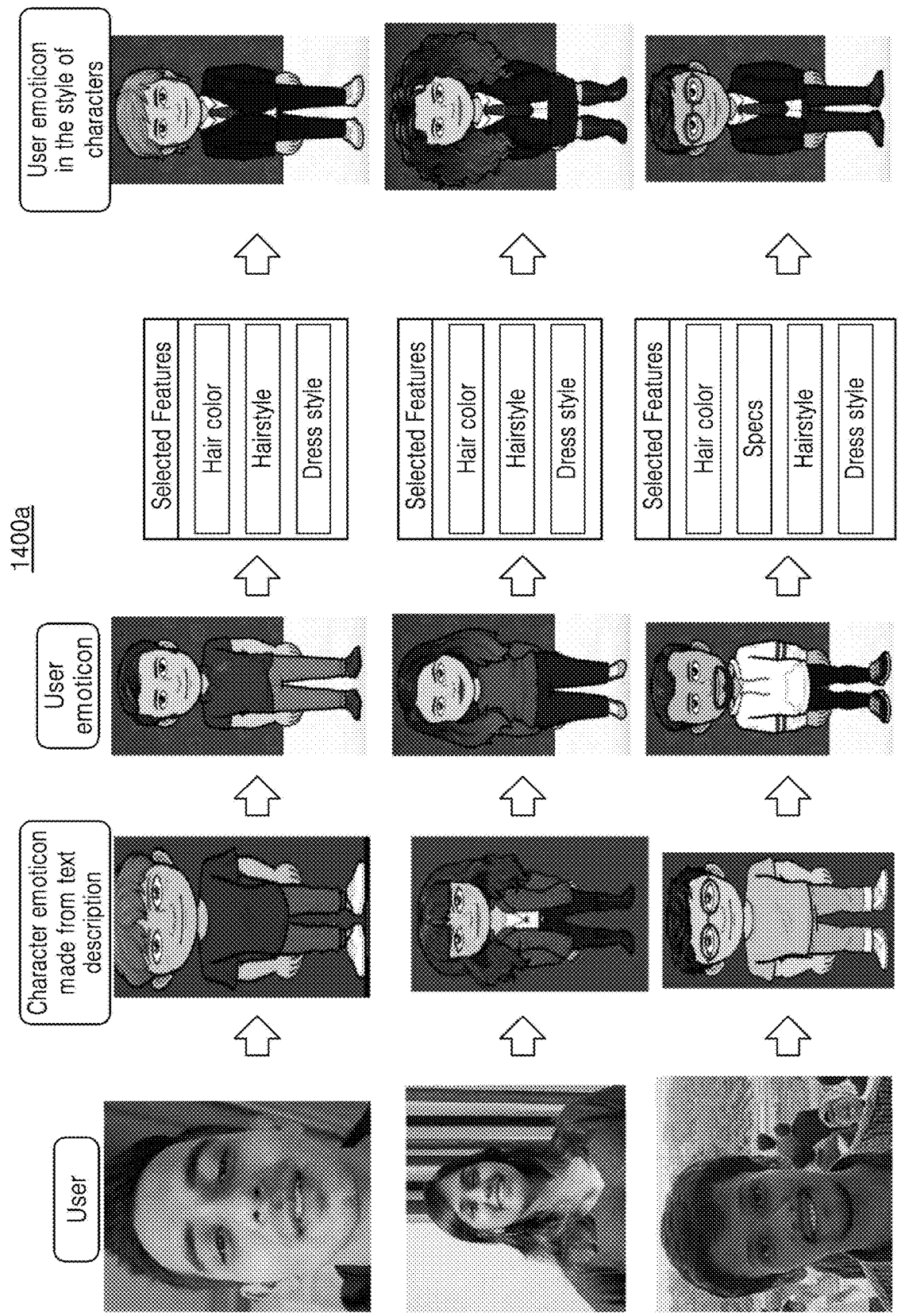
FIG. 14A illustrates an application use case depicting character based one or more emoticon generation for chat, stickers and Graphics Interchange Format (GIFs) according to an embodiment of the disclosure.

FIG. 14A illustrates an application use case 1400a depicting character based one or more emoticon generation for chat, stickers and graphics interchange format (GIFs), according to an embodiment of the disclosure.

Referring to FIG. 14A, in an embodiment of the disclosure, the character may be one or more fictional characters.

At operation 1402a, a character emoticon may be made from a text description associated with one or more users.

At operation 1404a, one or more emoticons associated with the one or more users may be generated.

At operation 1406a, one or more user emoticons in a style of character may be generated based on selected features related to the characters.

Figure 14B:
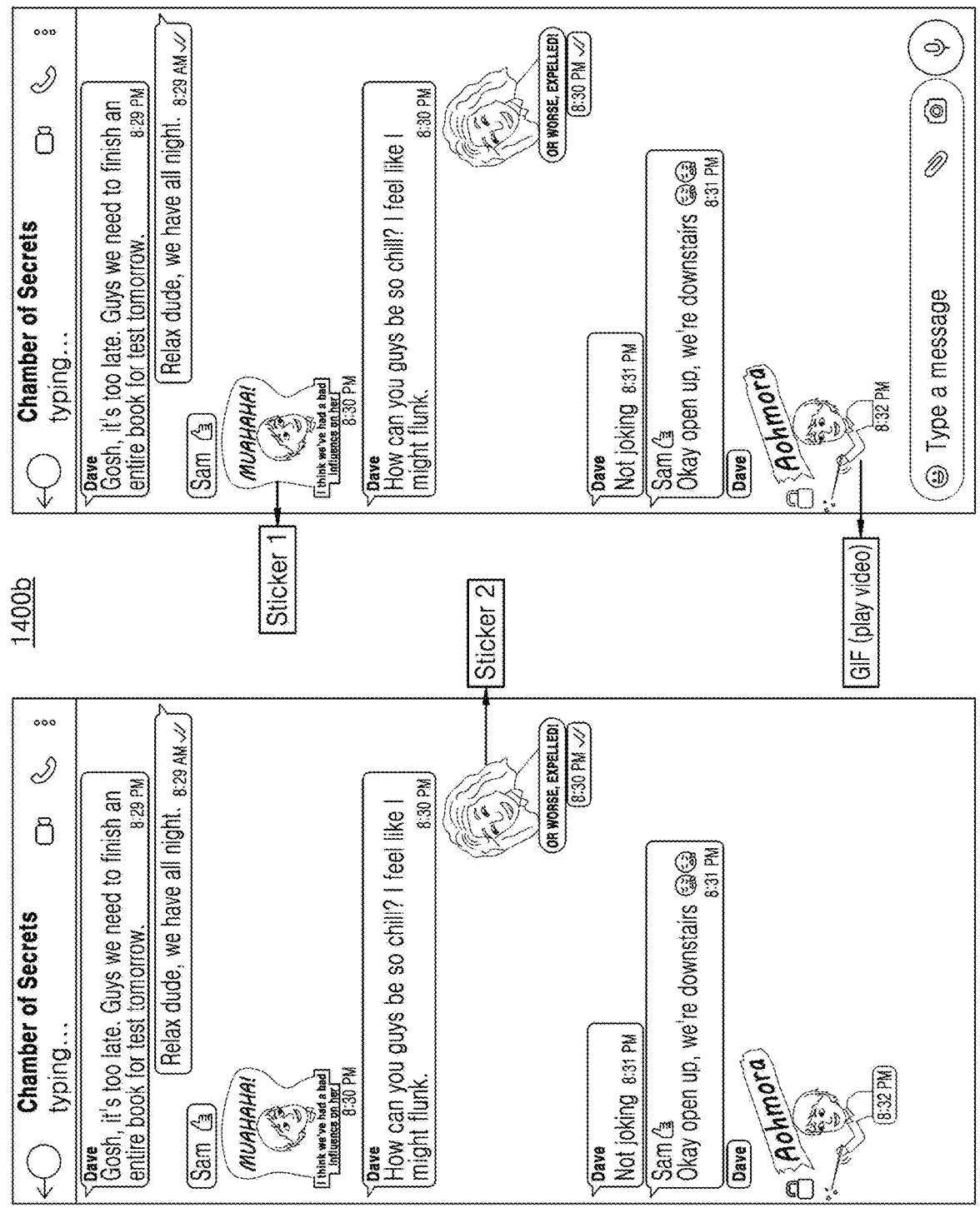
FIG. 14B illustrates an application use case depicting context-based chat stickers and GIFs matching a response from a sender according to an embodiment of the disclosure.

FIG. 14B illustrates an application use case 1400b depicting context-based chat stickers and GIFs matching a response from a sender according to an embodiment of the disclosure.

Referring to FIG. 14B, a system may assess a response to determine if a sticker may be generated using one or more fictional characters mapped to the sender. The chat stickers and the GIFs also contain one-liners from a story such that the one-liners may be relevant in the context of the chat.

FIG. 14C illustrates an application use case 1400c depicting context-based chat stickers and GIFs matching a response from a sender according to an embodiment of the disclosure.

Referring to FIG. 14C, a system may assess a response to determine if a sticker may be generated using one or more fictional characters mapped to the sender. The chat stickers may be based on one or more fictional characters generated based on context.

Figure 15:
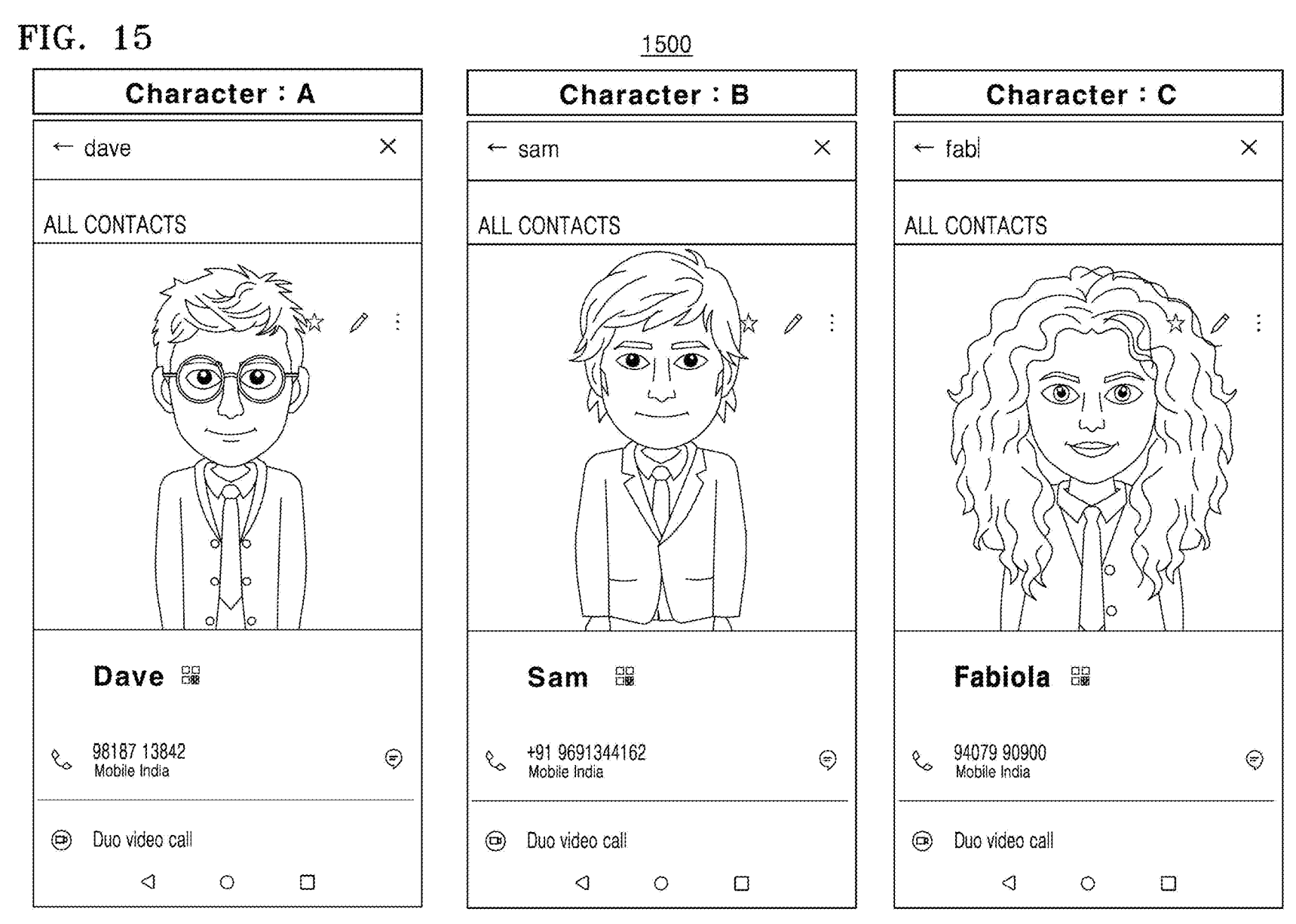

FIG. 15 illustrates an application use case 1500 depicting generation of contact photos in style of one or more fictional characters according to an embodiment of the disclosure.

Referring to FIG. 15, in an embodiment of the disclosure, a contact Photo may be created in style of the one or more fictional characters based on personality traits.

FIG. 16 illustrates an application use case 1600 depicting generation of one or more emoticons for video calling and social media stories according to an embodiment of the disclosure.

Referring to FIG. 16, the one or more emoticons in a style of one or more fictional characters may be used during the video calls, stories, and social media posts.

Figure 17:
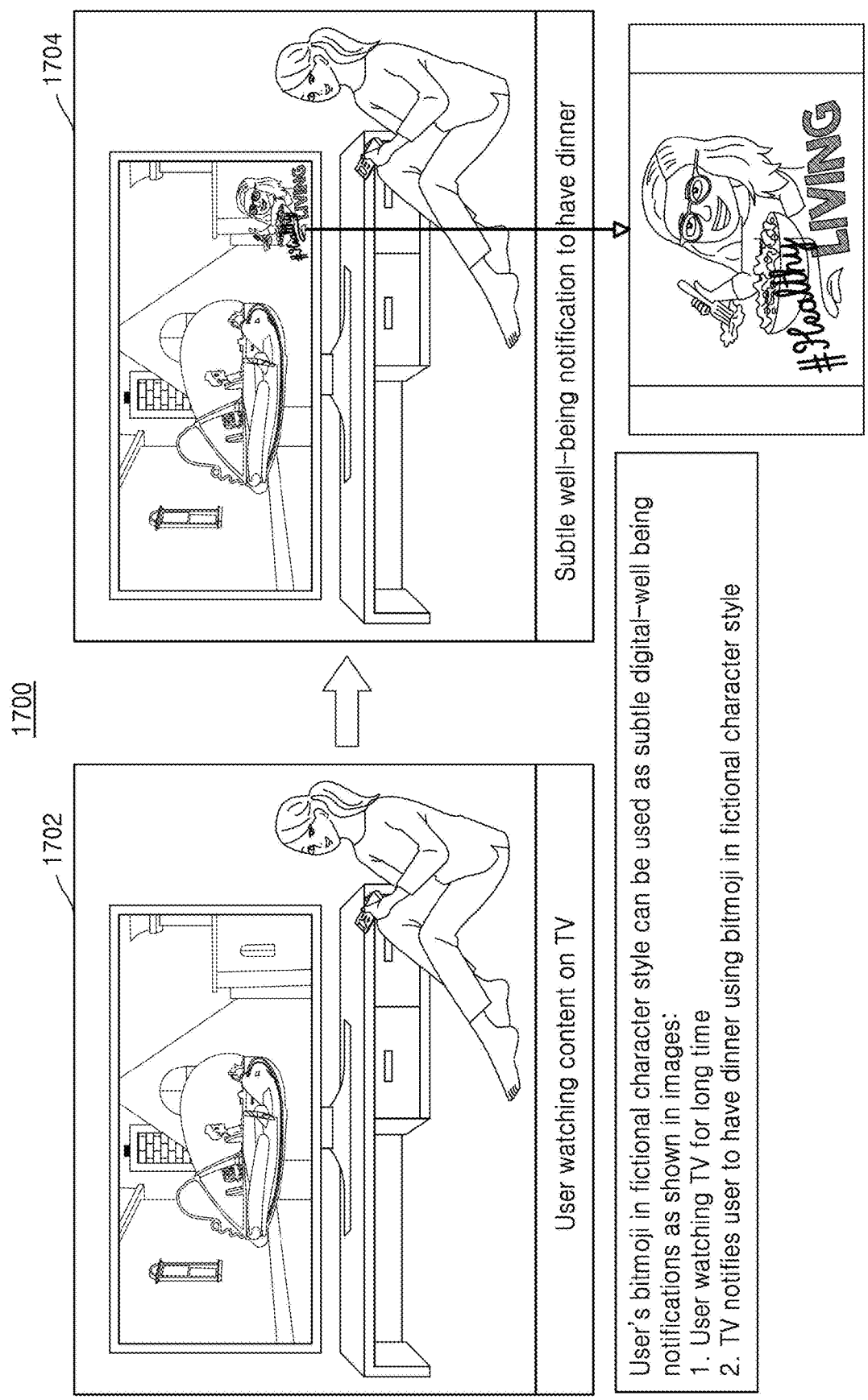
FIG. 17 illustrates an application use case for generation of digital notifications based on one or more emoticons according to an embodiment of the disclosure.

FIG. 17 illustrates an application use case 1700 for generation of digital notifications based on one or more emoticons accordance to an embodiment of disclosure.

Referring to FIG. 17, in an embodiment of the disclosure, the digital notifications may be digital well-being notifications. The one or more emoticons related to a user in a fictional character style may be used as subtle digital-wellbeing notifications.

At operation 1702, the user is watching TV for long time.

At operation 1704, a Tele Vision notifies the user to have dinner using the one or more fictional characters in fictional character style.

Figure 18:
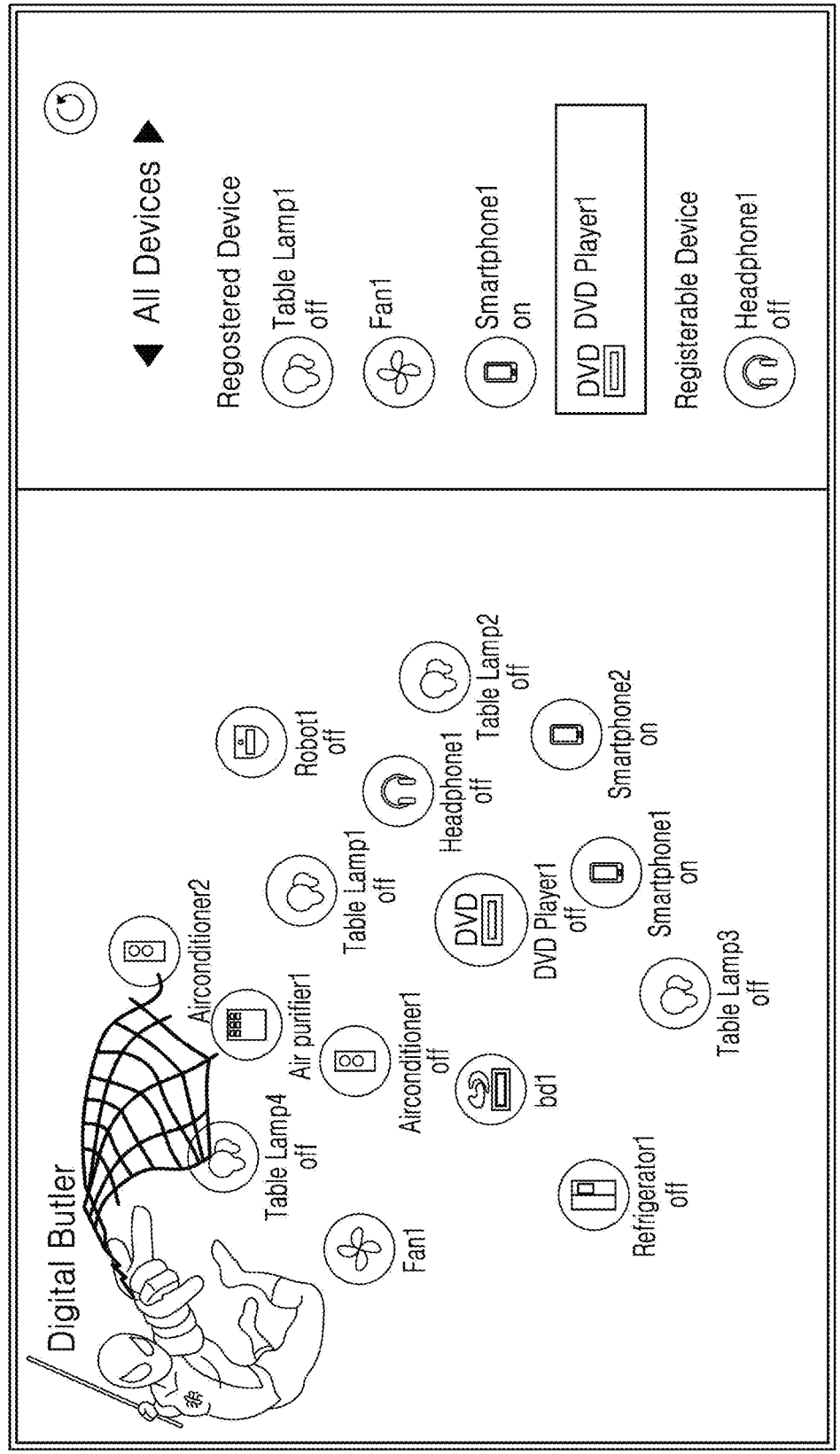
FIG. 18 illustrates an application use case depicting generation of one or more emoticons for system settings according to an embodiment of the disclosure.

FIG. 18 illustrates an application use case 1800 depicting generation of one or more emoticons for system settings according to an embodiment of the disclosure.

Referring to FIG. 18, in an embodiment of the disclosure, the one or more emoticons generated may be used with a number of system settings of a Tele Vision and mobile phones.

Using the one or more emoticons with settings may make UI/UX fun and eventful further helping in conveying a better sense of clarity and purpose of a number of existing settings. The one or more emoticons may be used with the one or more emoticons animation and a text to cover aspects of the setting and assist the user in reaching desirable configuration. An animated may be used as a representative of a digital butler. The digital butler may be able to identify various nearby devices and connect them to TV much efficiently like Spiderman is able to grab nearby objects.

FIG. 19 illustrates an application use case 1900 depicting generation of one or more emoticons for system settings according to an embodiment of the disclosure.

Referring to FIG. 19, the sound settings may be assisted by an animated character emoticon with auditory senses. Picture settings may be assisted by another animated emoticon with great visual and analytical skills.

Figure 20:
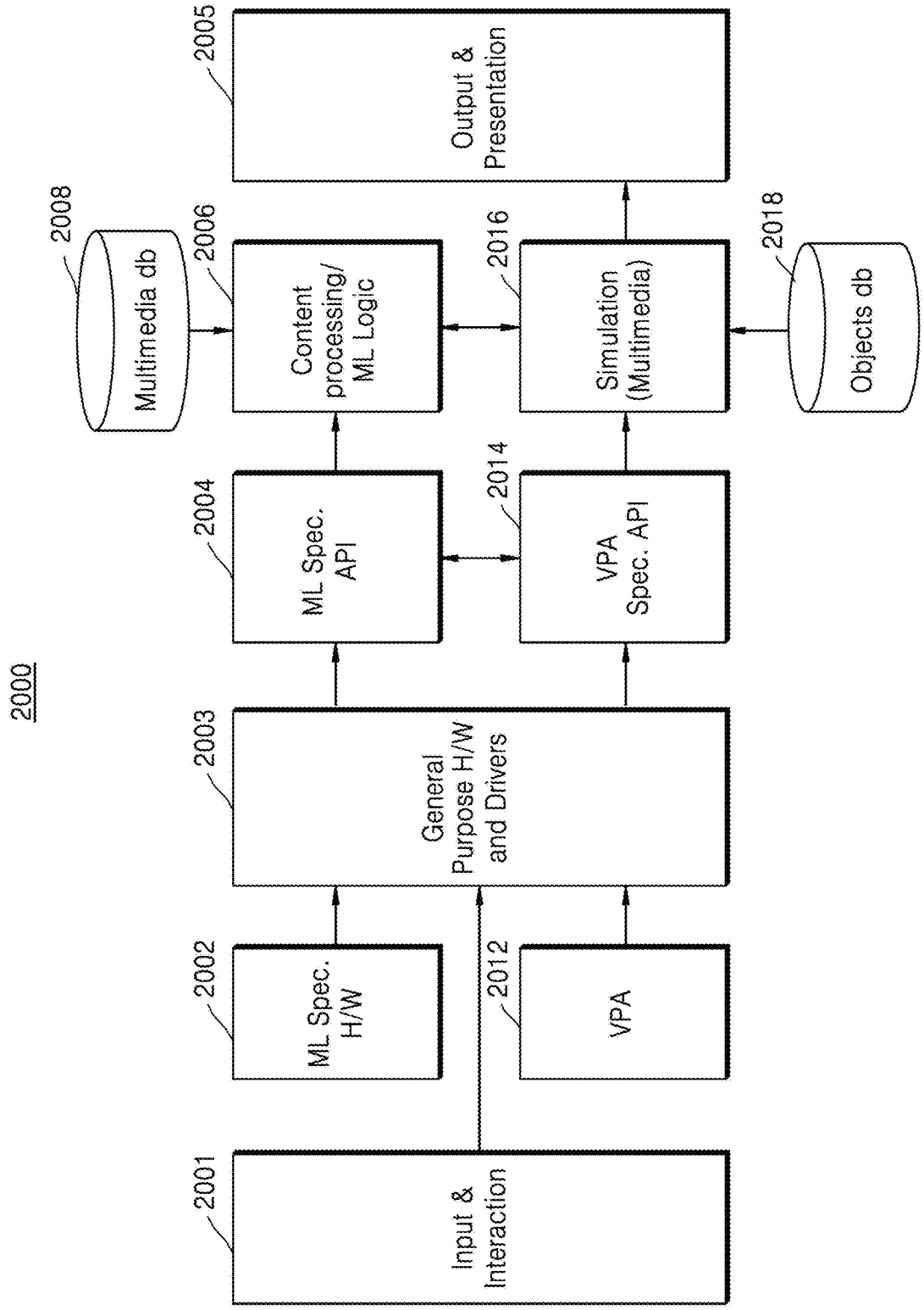
FIG. 20 illustrates a representative architecture to provide tools and development environment described herein for a technical-realization of the implementation in FIGS. 1A and 1B, 2A and 2B, 3 to 12, 13A and 13B, 14A to 14C, and 15 to 19 through an AI model-based computing device according to an embodiment of the disclosure.

FIG. 20 illustrates a representative architecture 2000 to provide tools and development environment described herein for a technical-realization of the implementation in preceding figures through a virtual personal assistance (VPA) based computing device according to an embodiment of the disclosure.

FIG. 20 is merely a non-limiting example, and it will be appreciated that many other architectures may be implemented to facilitate the functionality described herein. The architecture may be executing on hardware, such as a computing machine 202 of FIG. 2B that includes, among other things, processors, memory, and various application-specific hardware components.

Referring to FIG. 20, an architecture 2000 may include an operating-system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., universal serial bus (USB) drivers), Wi-Fi® drivers, audio drivers, power management drivers, and so forth depending on the hardware configuration.

A hardware interface layer includes libraries which may include system libraries, such as file-system (e.g., C standard library) that may provide functions, such as memory allocation functions, string manipulation functions, mathematic functions, and the like. In addition, the libraries may include API libraries, such as audio-visual media libraries (e.g., multimedia data libraries to support presentation and manipulation of various media format, such as moving picture experts group 4 (MPEG)4, H.264, MPEG-1 or MPEG-2 audio layer 3 (MP3), advanced audio coding (AAC), adaptive multi-rate (AMR), joint photographic group (JPG), portable graphics format (PNG)), database libraries (e.g., SQLite that may provide various relational database functions), web libraries (e.g., WebKit that may provide web browsing functionality), and the like.

A middleware may provide a higher-level common infrastructure, such as various graphical user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific integrated circuit (ASIC) chip, field-programmable gate arrays (FPGAs), and programmable-logic device, which have been known or are to be developed.

Further, the architecture 2000 depicts an aggregation of VPA based mechanisms and ML/NLP based mechanism in accordance with an embodiment of the present subject matter. A user-interface defined as input and interaction 2001 refers to overall input. It can include one or more of the following—a touch screen, a microphone, a camera, or the like. A first hardware module 2002 depicts specialized hardware for ML/NLP based mechanisms. In an example, the first hardware module 2002 comprises one or more of neural processors, FPGA, digital signal processor (DSP), GPU, or the like.

A second hardware module 2012 depicts specialized hardware for executing the VPA device-related audio and video simulations. ML/NLP based frameworks and APIs 2004 correspond to the hardware interface layer for executing the ML/NLP logic 2006 based on the underlying hardware. In an example, the frameworks may be one or more of the following—Tensorflow, Café, NLTK, GenSim, ARM Compute, or the like. VPA simulation 2016 frameworks and APIs 2014 may include one or more of—VPA Core, VPA Kit, Unity, Unreal, or the like.

A database 2008 depicts a pre-trained voice feature database. The database 2008 may be remotely accessible through cloud. In other example, the database 2008 may partly reside on cloud and partly on-device based on usage statistics.

Another database 2018 refers the speaker enrollment DB or the voice feature DB that will be used to authenticate and respond to the user. The database 2018 may be remotely accessible through cloud. In other example, the database 2018 may partly reside on the cloud and partly on-device based on usage statistics.

A rendering module 2005 is provided for rendering audio output and trigger further utility operations as a result of user authentication. The rendering module 2005 may be manifested as a display, a touch screen, a monitor, a speaker, a projection screen, or the like.

A general-purpose hardware and driver module 2003 corresponds to the computing device 202 as referred in FIG. 2B and instantiates drivers for the general purpose hardware units as well as the application-specific units (2002, 2012).

In an example, the NLP/ML mechanism and VPA simulations 2016 underlying the present architecture 2000 may be remotely accessible and cloud-based, thereby being remotely accessible through a network connection. A computing device, such as a VPA device may be configured for remotely accessing the NLP/ML modules and simulation modules may comprise skeleton elements, such as a microphone, a camera a screen/monitor, a speaker, or the like.

While specific language has been used to describe the disclosure, any limitations arising on account of the same are not intended. As would be apparent to a person in the art, various working modifications may be made to the method in order to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown, nor do all of the acts necessarily need to be performed. In addition, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus for generating one or more emoticons for one or more users with respect to one or more fictional characters, the apparatus comprising:
    a plurality of discriminators configured to:
        receive a first image generated by a multiple localized discriminator (MLD) generative adversarial network (GAN) based on a set of features from multiple sets of features associated with the one or more fictional characters, resulting in generation of an output value associated with each of the plurality of discriminators, and determine a weight associated with each of the plurality of discriminators based on a distance between each discriminator and the set of features;

at least one processor configured to generate, using a pre-trained info graph, an image info-graph associated with the first image generated by the MLD GAN upon receiving the first image;

calculate a relevance associated with each of the plurality of discriminators based on the image info-graph, the set of features and the distance; and the MLD GAN configured to:
generate a plurality of images representing a plurality of emoticons associated with the one or more fictional characters based on each of the multiple sets of features, and
generate the one or more emoticons by styling one or more user images with respect to one or more images selected from the plurality of images, and one or more user inputs.

2. The apparatus of claim 1, wherein the one or more user inputs comprise a plurality of facial features, a facial tone, a hair color, a body built, a dressing style, and one or more accessories worn by the one or more users.

3. The apparatus of claim 1, wherein the at least one processor is further configured to:
calculate a confidence score associated with the plurality of discriminators based on a plurality of parameters associated with each of the plurality of discriminators, and
select remaining sets of features after generation of the first image based on the confidence score associated with the plurality of discriminators.

4. The apparatus of claim 3, wherein a set of features corresponding to a discriminator with a high relevance among the plurality of discriminators is prioritized for selection.

5. The apparatus of claim 3, wherein the plurality of parameters comprise a weight, the output value, and the relevance associated with each of the plurality of discriminators.

6. The apparatus of claim 1, wherein the one or more images is selected from the plurality of images based on the output value of a discriminator associated with the one or more images from the plurality of discriminators.

7. The apparatus of claim 1, wherein the styling of the one or more user images comprises:
super-imposing the one or more images generated from the set of features associated with the one or more fictional characters onto the one or more user images; and
applying the one or more user inputs thereby generating the one or more emoticons.

8. The apparatus of claim 1, wherein the one or more fictional characters is based on one or more of a story, a conversation, a textual input, and a voice input.

9. The apparatus of claim 1 wherein the at least one processor is further configured to:
generate a fictional character info-graph associated with the one or more fictional characters based on a plurality of features associated with the one or more fictional characters,
generate a user info-graph associated with the one or more users based on a plurality of attributes associated with the one or more users, and
map the one or more fictional characters to the one or more users based on the plurality of features and the plurality of attributes.

10. The apparatus of claim 9,
wherein the fictional character info-graph is generated by:
analyzing, by a natural language processing (NLP) processor, one or more conversations and one or more dialogue exchanges between the one or more fictional characters with respect to an event node of a plot graph associated with the one or more fictional characters; and
determining, by the NLP processor, the plurality of features upon analyzing the one or more conversations and one or more dialogue exchanges, and
wherein the plurality of features comprises:
an interaction profile from one or more event nodes shared by the one or more fictional characters,
an emotional pallet associated with the one or more fictional characters describing a level of expression of one or more emotions experienced by the one or more fictional characters, and
one or more physical traits based on a textual description from the plot graph and one or more personality traits from the interaction profile and the emotion pallet for the one or more fictional characters.

11. The apparatus of claim 10 wherein the plot graph is a representation of a space of a plurality of possible stories associated with a scenario.

12. The apparatus of claim 9,
wherein the user info-graph is generated by:
analyzing, by the NLP processor, one or more conversations and one or more dialogue exchanges between the one or more users with respect to an event node of a plot graph associated with the one or more users and one or more social media activities of the one or more users; and
determining, by the NLP processor, the plurality of attributes upon analyzing the one or more conversations and one or more dialogue exchanges, and
wherein the plurality of attributes comprise:
an interaction profile from one or more event nodes shared by the one or more users,
an emotional pallet associated with the one or more users describing a level of expression of one or more emotions experienced by the one or more users, and
one or more physical traits based on a textual description from the plot graph and one or more personality traits from the interaction profile and the emotional pallet for the user.

13. The apparatus of claim 12, further comprising:
parsing, by an artificial intelligence (AI) processor, one or more of an audio input and a visual input to a textual form; and
sharing, by the AI processor, the textual form with the, by the NLP processor, for determining the interaction profile, the emotional pallet, and the one or more physical traits and the one or more personality traits.

14. The apparatus of claim 13, wherein the parsing by the AI processor comprises processing of an image, an audio, a video, and a multimedia content received in the form of the one or more of the audio input, and the visual input.

15. The apparatus of claim 9,
wherein the mapping of the one or more fictional characters to the one or more users comprises:
calculating a distance between the plurality of features and the plurality of attributes; and creating a mapping associated with the one or more users mapped corresponding to the one or more fictional character based on the distance, and wherein the one or more users is mapped to the one or more fictional characters.

16. The apparatus of claim 9, wherein the at least one processor is further configured to select, from a content database, the plurality of features associated with the one or more fictional characters and the plurality of attributes associated with the one or more users.

17. The apparatus of claim 1, wherein the at least one processor is further configured to receive the fictional character info-graph comprising the plurality of features associated with the one or more fictional characters;

select one or more features from the plurality of features uniquely defining the one or more fictional characters and transmitting the set of features; and generate the plurality of images upon receiving the multiple sets of features generated from the one or more features associated with the one or more fictional characters and transmitting the plurality of images to the plurality of discriminators.

18. The apparatus of claim 17, wherein the selecting of the one or more features comprises:

determining a character closeness ratio representing a closeness between the one or more fictional characters based on a distance between the one or more fictional characters.

19. The apparatus of claim 17, wherein the at least one processor is further configured to receive a user input as one of an audio input and a textual input; and select the one or more features from the fictional character info-graph based on the user input, wherein the one or more features uniquely define the one or more fictional characters.

20. A method of generating one or more emoticons for one or more users with respect to one or more fictional characters, the method comprising:

receiving, by a plurality of discriminators, a first image generated by a multiple localized discriminator (MLD) generative adversarial network (GAN) based on a set of features from multiple sets of features associated with the one or more fictional characters, resulting in generation of an output value associated with each of the plurality of discriminators;

determining, by the plurality of discriminators, a weight associated with each of the plurality of discriminators based on a distance between each discriminator and the set of features;

generating, by at least one processor, an image info-graph associated with the first image generated by the MLD GAN upon receiving the first image;

calculating a relevance associated with each of the plurality of discriminators based on the image info-graph, the set of features and the distance;

generating, by the MLD GAN, a plurality of images representing a plurality of emoticons associated with the one or more fictional characters based on each of the multiple sets of features; and generating, by the MLD GAN, the one or more emoticons by styling one or more user images with respect to one or more images selected from the plurality of images, and one or more user inputs.

\* \* \* \* \*